(12) United States Patent
Sumiya

(10) Patent No.: US 9,797,747 B2
(45) Date of Patent: Oct. 24, 2017

(54) ROTATION DETECTOR

(71) Applicant: DENSO CORPORATION, Kariya, Aichi-pref. (JP)

(72) Inventor: Kazuyoshi Sumiya, Hekinan (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 14/779,106

(22) PCT Filed: Apr. 15, 2014

(86) PCT No.: PCT/JP2014/002114
§ 371 (c)(1),
(2) Date: Sep. 22, 2015

(87) PCT Pub. No.: WO2014/171128
PCT Pub. Date: Oct. 23, 2014

(65) Prior Publication Data
US 2016/0054150 A1 Feb. 25, 2016

(30) Foreign Application Priority Data

Apr. 18, 2013 (JP) .................................. 2013-087609
Jun. 4, 2013 (JP) .................................. 2013-117549

(51) Int. Cl.
*G01B 7/14* (2006.01)
*G01R 33/06* (2006.01)
(Continued)

(52) U.S. Cl.
CPC ............ *G01D 5/16* (2013.01); *F02D 41/009* (2013.01); *F02D 41/0097* (2013.01); *G01D 5/145* (2013.01); *G01D 5/2457* (2013.01)

(58) Field of Classification Search
CPC .................................. G01D 5/145; G01D 5/16
(Continued)

(56) References Cited

U.S. PATENT DOCUMENTS 4,233,592 A * 11/1980 Leichle .................. F02P 7/061
250/231.14
4,551,676 A 11/1985 Amemiya et al.
(Continued)

FOREIGN PATENT DOCUMENTS

JP     S57-46117 A     3/1982
JP     H10-227806 A     8/1998
(Continued)

OTHER PUBLICATIONS

Office Action issued Mar. 1, 2016 in the corresponding JP application No. 2013-117549 (with English translation).
(Continued)

*Primary Examiner* — Reena Aurora
(74) *Attorney, Agent, or Firm* — Posz Law Group, PLC

(57) ABSTRACT

A rotation detection sensor is disposed to face an outer peripheral part of a signal rotor, and outputs a detection signal corresponding to a position of the outer peripheral part with the rotation of the signal rotor. The rotation detection sensor detects a rotation reference position with the detection of switching from projections to a missing tooth part on the basis of a gap to the signal rotor, and detects switching from the missing tooth part to the projections to output a rotation reference position signal indicative of position information on the rotation reference position at timing of the detection. An ECU receives the detection signal and the rotation reference position signal from the rotation detection sensor, and acquires the rotation reference position on the basis of the rotation reference position signal.

3 Claims, 16 Drawing Sheets

(51) Int. Cl.
  *G01D 5/16* (2006.01)
  *G01D 5/14* (2006.01)
  *F02D 41/00* (2006.01)
  *G01D 5/245* (2006.01)

(58) Field of Classification Search
  USPC .................................... 324/207.21, 207.25
  See application file for complete search history.

(56) References Cited

U.S. PATENT DOCUMENTS

| | | | |
|---|---|---|---|
| 5,493,219 A | | 2/1996 | Makino et al. |
| 5,604,304 A | | 2/1997 | Kokubo et al. |
| 5,606,257 A | * | 2/1997 | Krauter .................. F02P 7/067 324/166 |
| 5,869,962 A | | 2/1999 | Kasumi et al. |
| 6,252,395 B1 | | 6/2001 | Aoyama et al. |
| 2009/0251134 A1 | | 10/2009 | Uenoyama |

FOREIGN PATENT DOCUMENTS

| | | |
|---|---|---|
| JP | 2005-105882 A | 4/2005 |
| JP | 2006-038827 A | 2/2006 |
| JP | 2006-125240 A | 5/2006 |
| JP | 2010-085331 A | 4/2010 |
| JP | 2011-241759 A | 12/2011 |
| JP | 2012-167554 A | 9/2012 |

OTHER PUBLICATIONS

International Search Report of the International Searching Authority dated Jul. 22, 2014 for the corresponding international application No. PCT/JP2014/002114 (and English translation).

Written Opinion of the International Searching Authority dated Jul. 22, 2014 for the corresponding international application No. PCT/JP2014/002114 (and English translation).

* cited by examiner

ROTATION DETECTOR

CROSS REFERENCE TO RELATED APPLICATIONS

This application is a U.S. national stage of International Application No. PCT/JP2014/002114 filed on Apr. 15, 2014 and is based on Japanese Patent Application No. 2013-87609 filed on Apr. 18, 2013 and Japanese Patent Application No. 2013-117549 filed on Jun. 4, 2013, the disclosures of which are incorporated herein by reference.

TECHNICAL FIELD

The present disclosure relates to a rotation detector that detects a rotation reference position of a rotating body.

BACKGROUND ART

PTL 1 discloses a determination device configured to detect a rotation reference position of a rotating body according to rotation signals of the rotating body detected by a sensor. The sensor outputs the rotation signals every time the sensor faces multiple projections disposed on an outer periphery of the rotating body at regular intervals. A missing tooth part in which the projections are missing is disposed in the rotating body. The missing tooth part indicates a rotation reference position of the rotating body.

The determination device receives the rotation signal from the sensor at any time, and calculates a differential value of a ratio of time intervals of the rotation signals, that is, a time ratio of the rotation signals to compare the differential value with a threshold, thereby detecting the missing tooth part of the rotating body. In this way, the determination device detects the rotation reference position of the rotating body.

However, in the conventional art, the determination device employs a method of determining the missing tooth part with the use of the time ratio of the rotation signals. For that reason, timing at which the determination device receives the rotation signals from the sensor changes due to an instantaneous change in a rotation speed of the rotating body with the results that the differential value of the time ratio of the rotation signals is likely to exceed the threshold. Therefore, the determination device erroneously detects the missing tooth part, resulting in a risk that a sufficient detection precision of the rotation reference position of the rotating body is not obtained.

PRIOR ART LITERATURES

Patent Literature

PTL 1: JP-A-2012-167554

SUMMARY OF INVENTION

The present disclosure aims at providing a rotation detector that is capable of preventing a rotation reference position of a rotating body from being erroneously detected, and also capable of improving a detection precision of the rotation reference position of the rotating body.

The rotation detector is configured to detect the rotation reference position with respect to the rotation of the rotating body having an outer peripheral part and a rotation reference part indicative of a rotation reference position in a part of the outer peripheral part.

According to a first aspect of the present disclosure, a rotation detector includes a rotation detection sensor that is disposed to face an outer peripheral part of a rotating body, outputs detection signals corresponding to a position of the outer peripheral part with the rotation of the rotating body, detects a rotation reference position with the detection of switching from the outer peripheral part to the rotation reference part on the basis of a gap to the rotating body, detects switching from the rotation reference part to the outer peripheral part, and outputs a rotation reference position signal indicative of position information of the rotation reference position at detection timing.

The rotation detector includes a signal processing unit that receives the detection signals and the rotation reference position signals from the rotation detection sensor, and acquires the rotation reference position on the basis of the rotation reference position signals.

According to the above configuration, since the position of the rotation reference part is detected by the rotation detection sensor, even if the rotation speed of the rotating body instantaneously changes, the rotation reference position is surely detected without depending on a temporal change in the detection period of the rotation reference part. In other words, a temporal determination to detect the rotation reference position on the basis of the detection period of the rotation reference part can be abolished. Therefore, the erroneous detection of the rotation reference position of the rotating body can be prevented, and a detection precision in the rotation reference position of the rotating body can be improved.

According to a second aspect of the present disclosure, the rotation detector includes a first resistor that has a first magnetic resistive element and a second magnetic resistive element connected in series with each other, and detects a change in resistance value when the first magnetic resistive element and the second magnetic resistive element are affected by a magnetic field with the rotation of the rotating body.

The rotation detector includes an amplifier that converts a change in the resistance value of the first resistor into a waveform signal, a peak/bottom detection unit that receives the waveform signal to detect a peak value or a bottom value of an amplitude of the waveform signal, and a determination unit that receives the peak value or the bottom value detected by the peak/bottom detection unit to acquire the rotation reference position on the basis of the peak value or the bottom value.

The first resistor outputs a signal including a first waveform corresponding to the outer peripheral part and a second waveform corresponding to switching from the outer peripheral part to the rotation reference part and larger in amplitude than the first waveform as the waveform signal. Further, the peak/bottom detection unit detects the peak value or the bottom value of the amplitude of the second waveform larger than the amplitude of the first waveform.

According to the above configuration, the peak value or the bottom value of the amplitude of the waveform signal is detected by the peak/bottom detection unit on the basis of a difference between the amplitude of the first waveform and the amplitude of the second waveform contained in the waveform signal. For that reason, even if the rotation speed of the rotating body is instantaneously changed, the rotation reference position can be surely detected without depending on the temporal change of the detection period of the rotation reference part. Therefore, the erroneous detection of the rotation reference position of the rotating body can be prevented, and a detection precision in the rotation reference position of the rotating body can be improved.

DESCRIPTION OF EMBODIMENTS

Figure 1:
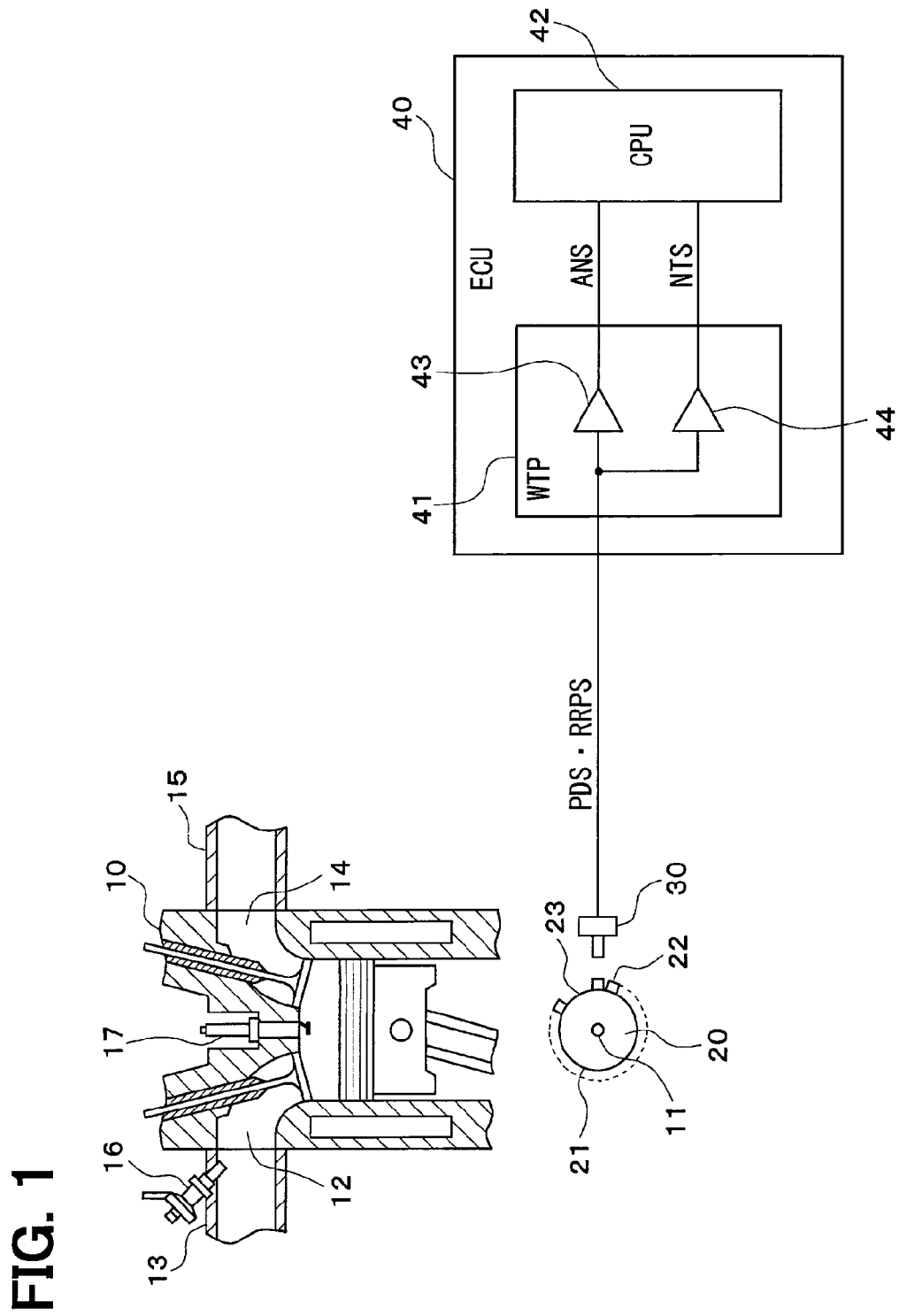
FIG. 1 is a configuration diagram of an internal combustion engine employing a rotation detector according to a first embodiment.

Embodiments will be described with reference to the drawings. In the following respective embodiments, parts identical with or equivalent to each other are denoted by the same symbols in the drawings.

First Embodiment

Hereinafter, a first embodiment will be described with reference to the drawings. A rotation detector is used, for example, as a crank angle determination device for an internal combustion engine. As illustrated in FIG. 1, the rotation detector includes a rotation detection sensor 30 disposed to face an outer peripheral part 21 of a signal rotor 20 fixed to a crank shaft 11 of an engine 10 which is an internal combustion engine, and an ECU (electrical control unit) 40 that performs various controls of the engine 10.

In the internal combustion engine, an intake port 12 of the engine 10 is connected with an intake pipe 13, and an exhaust port 14 of the engine 10 is connected with an exhaust pipe 15. A fuel injection valve 16 for injecting fuel toward the intake port 12 is fitted in the vicinity of the intake port 12 of each cylinder. Further, an ignition plug 17 is fitted to a cylinder head of the engine 10 for each cylinder, and an air-fuel mixture in the cylinder is ignited by a spark discharge of the ignition plug 17 of each cylinder. Operation of the fuel injection valve 16 and the ignition plug 17 is controlled by the ECU 40.

Figure 2:
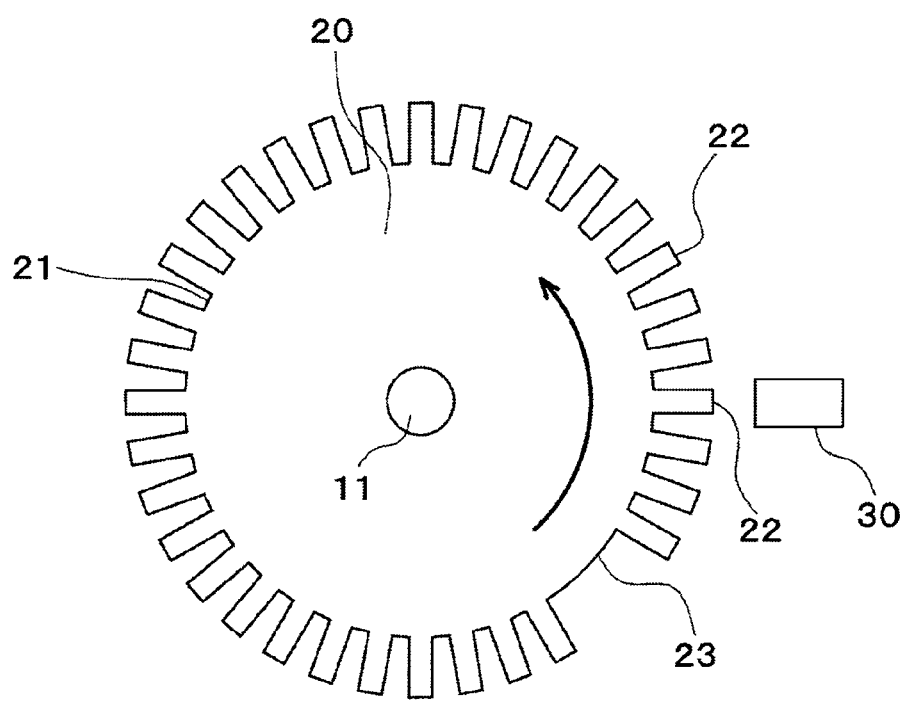
FIG. 2 is a diagram illustrating an arrangement relationship between a signal rotor and a rotation detection sensor.

As illustrated in FIG. 2, on the outer peripheral part 21 of the signal rotor 20, multiple projections 22 are disposed at regular intervals, and a missing tooth part 23 in which one or multiple projections 22 are missing is disposed at a specific crank angle. The missing tooth part 23 corresponds to a rotation reference position of the signal rotor 20, that is, a reference angle of the crank angle. In this embodiment, for example, 34 projections 22 are disposed on the outer peripheral part 21 of the signal rotor 20. The missing tooth part 23 is a portion of the outer peripheral part 21 of the signal rotor 20 in which, for example, two projections 22 are missing.

The rotation detection sensor 30 outputs a pulsed detection signal (PDS) (PDS) corresponding to a position of the outer peripheral part 21, that is, the crank angle with the rotation of the signal rotor 20. The rotation detection sensor 30 is a so-called crank angle sensor.

The rotation detection sensor 30 includes, for example, a first resistor having a first magnetic resistive element and a second magnetic resistive element, and a second resistor having a third magnetic resistive element and a fourth magnetic resistive element, which are not shown. The rotation detection sensor 30 further includes a processing arithmetic circuit not shown for processing signals detected by the respective magnetic resistive elements. The first resistor and the second resistor are disposed to face the signal rotor 20. The respective midpoints of the first magnetic resistive element and the second magnetic resistive element in the first resistor configuring a half-bridge circuit, and the third magnetic resistive element and the fourth magnetic resistive element in the second resistor similarly configuring a half-bridge circuit are connected to the processing arithmetic circuit.

With the above configuration of the rotation detection sensor 30, the first resistor and the second resistor change the respective resistance values according to a rotation position of the signal rotor 20, that is, the presence or absence of the projections 22. This results in a change in the voltage of the midpoints of the magnetic resistive elements. Therefore, the processing arithmetic circuit of the rotation detection sensor 30 acquires the change in the voltage of the midpoint as a waveform signal (WAS) with the rotation of the signal rotor 20. The processing arithmetic circuit compares an amplitude of the waveform signal (WAS) with a binarization threshold (TTH) to generate a detection signal (PDS) in which the waveform signal (WAS) is binarized. Therefore, the rotation detection sensor 30 outputs the detection signal (PDS) every time the rotation detection sensor 30 faces the projections 22.

The rotation detection sensor 30 has a function of detecting the rotation reference position of the signal rotor 20 with the detection of switching from the projections 22 disposed on the outer peripheral part 21 to the missing tooth part 23 on the basis of a gap to the signal rotor 20. Further, the rotation detection sensor 30 has a function of detecting switching from the missing tooth part 23 to the projections 22 disposed on the outer peripheral part 21 to output a rotation reference position signal (RRPS) indicative of position information on the rotation reference position at timing of the detection. In this embodiment, the rotation detection sensor 30 sets an amplitude of the rotation reference position signal (RRPS) to be larger than an amplitude of the detection signal (PDS) for outputting. In other words, the rotation reference position signal (RRPS) includes information on the detection signal (PDS).

The ECU 40 has a function of receiving the detection signal (PDS) and the rotation reference position signal (RRPS) from the rotation detection sensor 30 to acquire a position of the missing tooth part 23 of the signal rotor 20, that is, the rotation reference position on the basis of those signals. For that reason, as illustrated in FIG. 1, the ECU 40 includes a waveform processing unit (WTP) 41 and a CPU 42.

The waveform processing unit 41 includes a first comparator 43 that generates an angle signal (ANS) indicative of a crank angle from the detection signal (PDS) and the rotation reference position signal (RRPS), and a second comparator 44 that generates a toothless signal (NTS) indicative of a position of the missing tooth part 23 from the rotation reference position signal (RRPS). In this embodiment, thresholds of the respective comparators 43 and 44 are set so that the first comparator 43 detects the detection signal (PDS) and the rotation reference position signal (RRPS), and the second comparator 44 detects only the rotation reference position signal (RRPS), on the basis of the magnitude of an amplitude of each signal.

Therefore, the first comparator 43 outputs the angle signal (ANS) corresponding to a rotation angle of the signal rotor 20 every time the first comparator 43 receives the detection signal (PDS) and the rotation reference position signal (RRPS). On the other hand, the second comparator 44 outputs the toothless signal (NTS) indicative of a position of the missing tooth part 23, that is, the rotation reference position of the signal rotor 20 every time the second comparator 44 receives the rotation reference position signal (RRPS).

The CPU 42 has a function of receiving the toothless signal (NTS) from the waveform processing unit 41 to acquire the rotation reference position of the signal rotor 20, that is, a position of the missing tooth part 23. The CPU 42 receives the angle signal (ANS) to acquire which of the angle signals (ANS) is indicative of the position of the missing tooth part 23 on the basis of the toothless signal (NTS). With the above function, the CPU 42 can acquire the rotation angle of the signal rotor 20.

The ECU 40 mainly includes a microcomputer having the CPU 42, and is configured to execute various engine control programs stored in a built-in ROM. The ECU 40 receives signals from respective sensors such as a throttle opening sensor, an intake pipe pressure sensor, and a coolant temperature sensor not shown which are installed in the engine 10, and controls a fuel injection quantity of the fuel injection valve 16, an ignition timing of the ignition plug 17, and a throttle opening (intake air quantity) according to an engine operating state. The overall configuration of the rotation detector according to this embodiment is described above.

Next, operation of the rotation detector will be described. First, as illustrated in FIG. 3, when the signal rotor 20 rotates, the rotation detection sensor 30 acquires the waveform signal (WAS) on the basis of a change in a gap between the rotation detection sensor 30 and the outer peripheral part 21 of the signal rotor 20.

Figure 3:
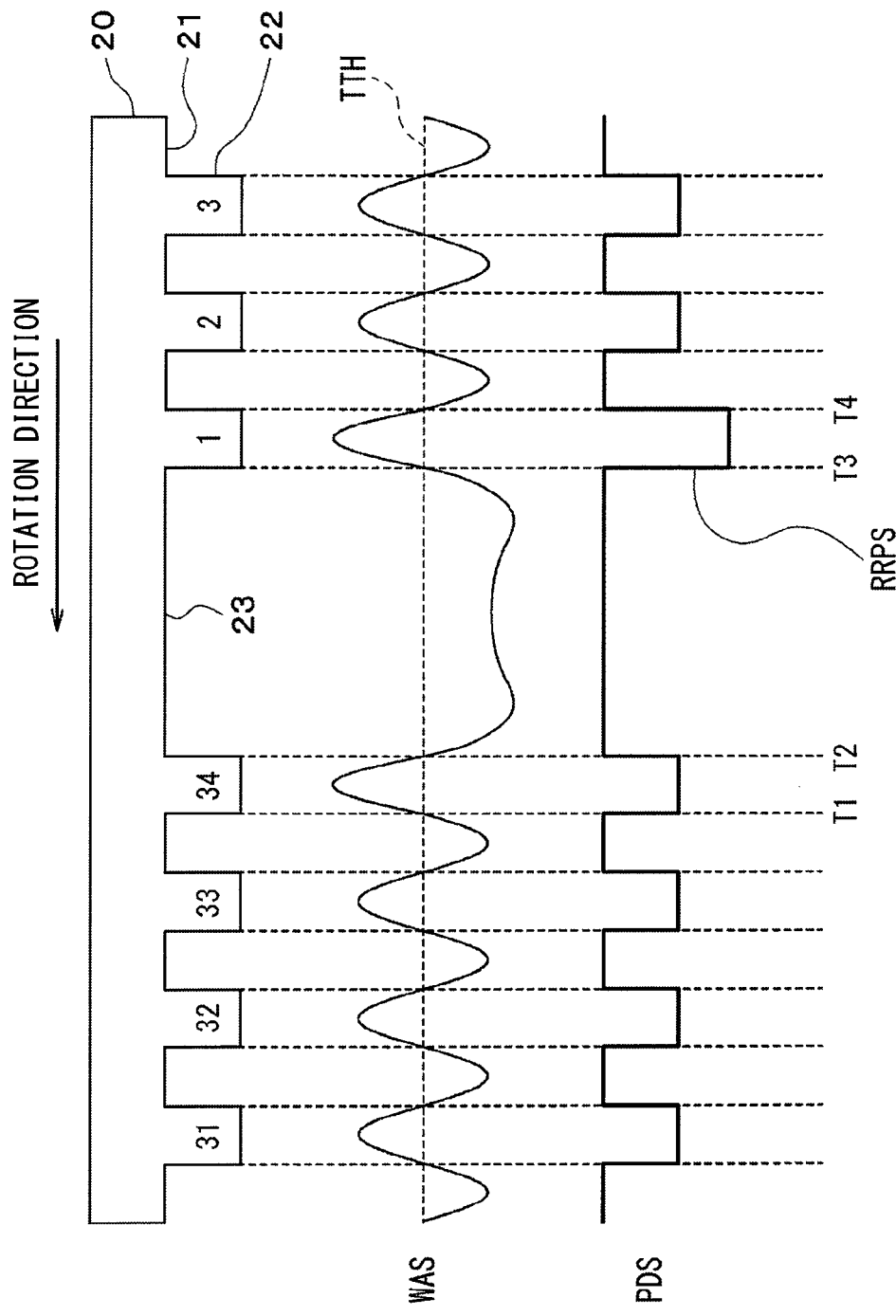
FIG. 3 is a timing chart illustrating a waveform signal (WAS) corresponding to projections and a missing tooth part of a signal rotor, a detection signal (PDS), and a rotation reference position signal (RRPS).

In FIG. 3, the outer peripheral part 21 of the disc-shaped signal rotor 20 is linearly drawn. The projections 22 on an upstream side of the missing tooth part 23 in the rotation in a direction of rotating the signal rotor 20 are called first, second, and third projections in order. On the other hand, the projections 22 on a downstream side of the missing tooth part 23 in the rotation are called 34th, 33rd, 32nd, and 31st projections in order.

The rotation detection sensor 30 compares the amplitude of the waveform signal (WAS) with the binarization threshold (TTH), and generates and outputs, the detection signal (PDS) of, for example, Lo if the amplitude of the waveform signal (WAS) is larger than the binarization threshold (TTH), and the detection signal (PDS) of, for example, Hi if the amplitude of the waveform signal (WAS) is smaller than the binarization threshold (TTH). The amplitude of the waveform signal (WAS) is the same on a location of the outer peripheral part 21 of the signal rotor 20 where the projections 22 are aligned at regular intervals. Specifically, the amplitudes of the waveform signals (WAS) corresponding to the respective projections 22 from the second projection to the 33rd projection are identical with each other.

On the other hand, the amplitude of the waveform signal (WAS) corresponding to the 34th projection 22 when switching from the 34th projection 22 to the missing tooth part 23 is larger than the amplitudes of the waveform signals (WAS) corresponding to the respective projections 22 from the second projection to the 33rd projection. Likewise, the amplitude of the waveform signal (WAS) corresponding to the first projection 22 when switching from the missing tooth part 23 to the first projection 22 is larger than the amplitudes of the waveform signals (WAS) corresponding to the respective projections 22 from the second projection to the 33rd projection. This is because the change in the gap between the rotation detection sensor 30 and the outer peripheral part 21 of the signal rotor 20 is not kept constant.

Thereafter, after a time point T1, the rotation detection sensor 30 determines that the amplitude of the waveform signal (WAS) is larger than the normal amplitude. For example, the rotation detection sensor 30 compares with the amplitude of the waveform signal (WAS) with a switch threshold to detect switching from the 34th projection 22 to the missing tooth part 23. With the above detection, the rotation detection sensor 30 detects the rotation reference position of the signal rotor 20 at a time point T2.

Subsequently, at a time point T3, the rotation detection sensor 30 detects switching from the missing tooth part 23 to the first projection 22 on the basis of a change in the amplitude of the waveform signal (WAS). In other words, the rotation detection sensor 30 detects that the amplitude of the waveform signal (WAS) exceeds the binarization threshold (TTH). Further, the rotation detection sensor 30 outputs the rotation reference position signal (RRPS) indicative of position information on the rotation reference position at the time point T3. In this embodiment, the rotation detection sensor 30 outputs a signal of the amplitude larger than the amplitude of the detection signal (PDS) as the rotation reference position signal (RRPS).

Thereafter, after a time point T4, the amplitude of the waveform signal (WAS) does not exceed the switch threshold. Therefore, the rotation detection sensor 30 generates the detection signals (PDS) corresponding to the second to 33rd projections 22, and outputs the detection signal (PDS) to the ECU 40.

Figure 4:
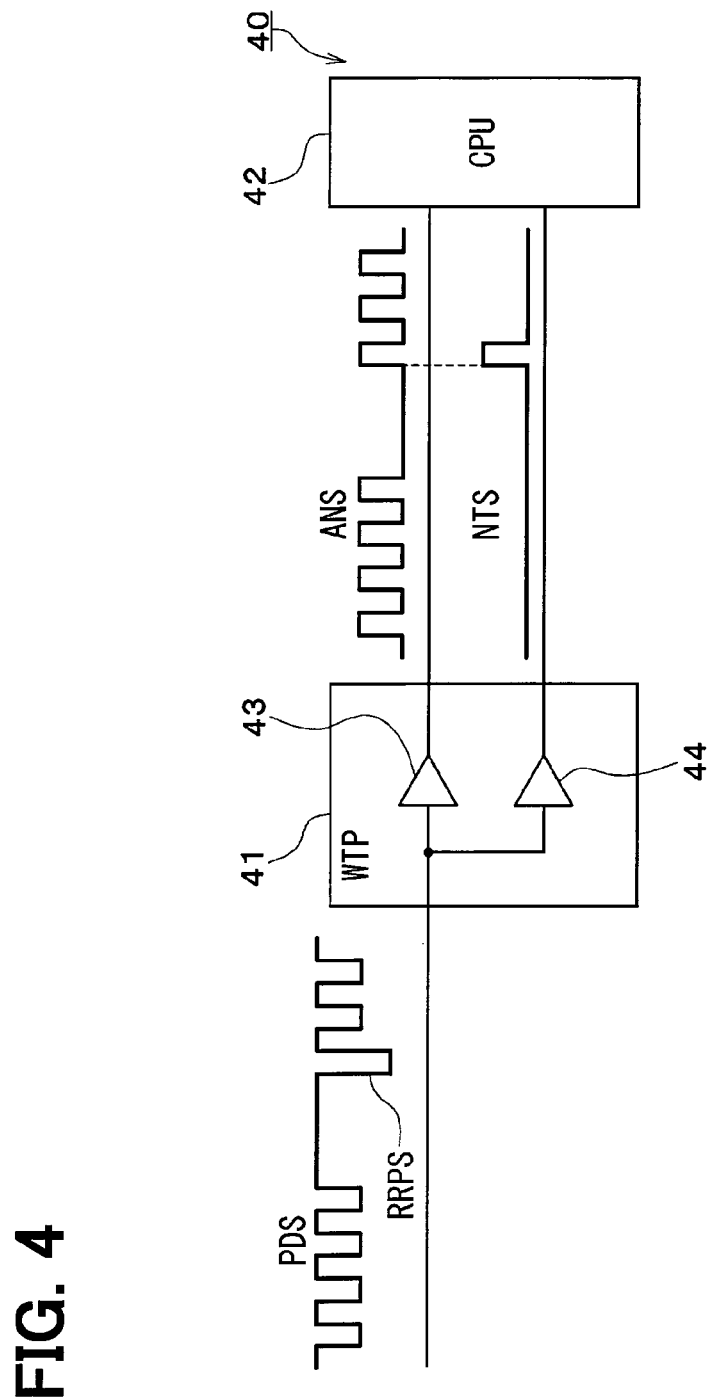
FIG. 4 is a schematic view of the generation of an angle signal (ANS) and a toothless signal (NTS) from a detection signal (PDS) and a rotation reference position signal (RRPS) in an ECU.

As illustrated in FIG. 4, the ECU 40 receives the detection signal (PDS) and the rotation reference position signal (RRPS) from the rotation detection sensor 30. In association with that reception, the waveform processing unit 41 generates the angle signals (ANS) corresponding to the detection signal (PDS) and the rotation reference position signal (RRPS) by the first comparator 43. The waveform processing unit 41 detects only the rotation reference position signal (RRPS) by the second comparator 44, and generates the toothless signal (NTS) corresponding to the rotation reference position signal (RRPS). Since the amplitudes of the detection signal (PDS) and the rotation reference position signal (RRPS) are different from each other, the waveform processing unit 41 can discriminate the detection signal (PDS) and the rotation reference position signal (RRPS) from each other.

The CPU 42 receives the toothless signal (NTS) to acquire the rotation reference position, which is a position of the missing tooth part 23 of the signal rotor 20, as a reference angle of the crank angle. The CPU 42 controls the fuel injection valve 16 and the ignition plug 17 with the use of the information on the rotation reference position.

Figure 5:
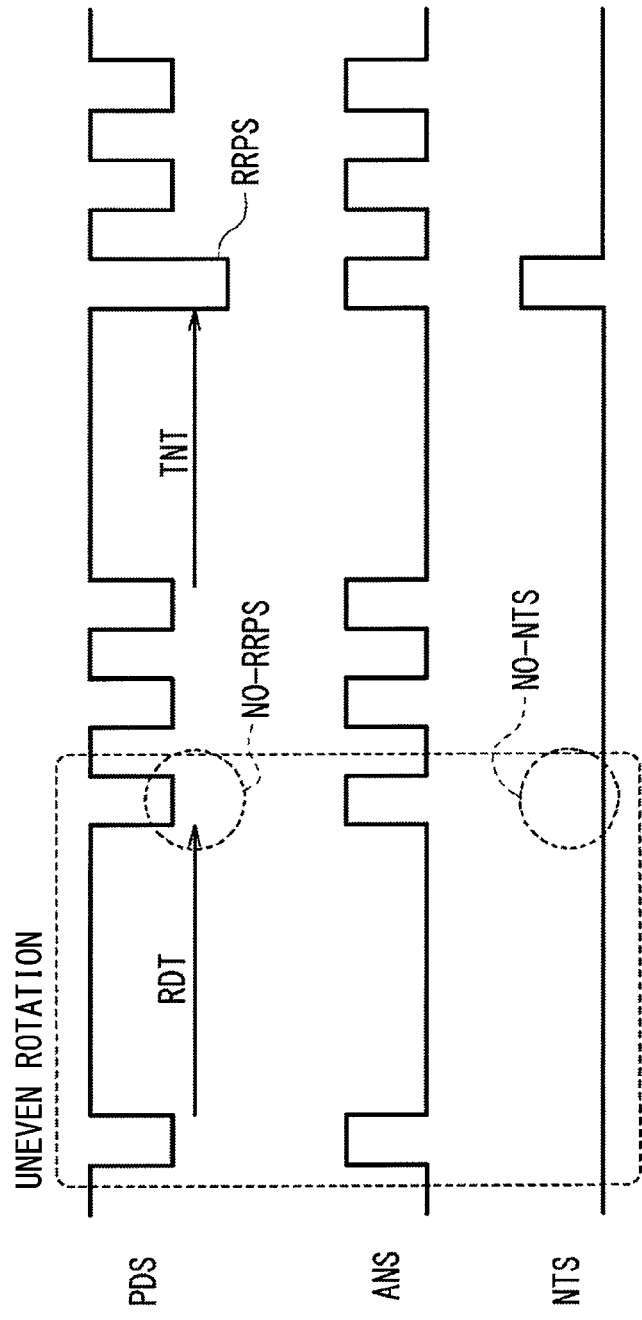
FIG. 5 is a timing chart illustrating that no toothless signal (NTS) is generated even if a rotation unevenness is generated in the signal rotor.

As described above, in this embodiment, with the use of a change in the amplitude of the waveform signal (WAS) by switching between the projections 22 and the missing tooth part 23, the rotation detection sensor 30 outputs the rotation reference position signal (RRPS) indicative of the rotation reference position of the missing tooth part 23. A configuration in which the toothless signal (NTS) is acquired from the rotation reference position signal (RRPS) is featured in the ECU 40. With the above configuration, for example, as illustrated in FIG. 5, even if the rotation speed of the signal rotor 20 is instantaneously changed to generate the rotation unevenness in the signal rotor 20, the rotation reference position signal (RRPS) indicative of the rotation reference position can be prevented from being generated in the rotation detection sensor 30.

In particular, at a low-temperature start time of the internal combustion engine (start at −10° C. or lower), an engine rotation speed (cranking rotation speed) decreases with an increase in friction. With the above operation, a variation in the engine rotation speed increases in the vicinity of a compression TDC (compression top dead center) due to a compression torque of a compression stroke, and as illustrated in FIG. 5, time intervals of the detection signals (PDS) tend to be largely varied. For that reason, although an object to be detected is not the missing tooth part 23, a time ratio between the detection signals (PDS) exceeds a threshold in the vicinity of the compression TDC, and the missing tooth part 23 may be erroneously detected. However, in this embodiment, since the temporal determination to detect the rotation reference position on the basis of the detection period of the missing tooth part 23 is abolished, even if a rotation unevenness time (RDT) equivalent to a toothless time (TNT) during which the missing tooth part 23 is detected is generated, the toothless signal (NTS) is not generated. Therefore, the rotation reference position can be surely detected without depending on the temporal change in the detection period of the missing tooth part 23, and further the rotation reference position can be prevented from being erroneously detected.

Since the rotation reference position can be surely detected, a detection precision in the rotation reference position of the signal rotor 20 can be improved. In recent years, there is a demand to enhance an angular resolution of the crank angle, that is, narrow an angular interval, and the above technique can satisfy the demand.

The signal rotor 20 corresponds to "rotating body", and the missing tooth part 23 corresponds to "rotation reference part". The ECU 40 corresponds to "signal processing unit".

Second Embodiment

Figure 6:
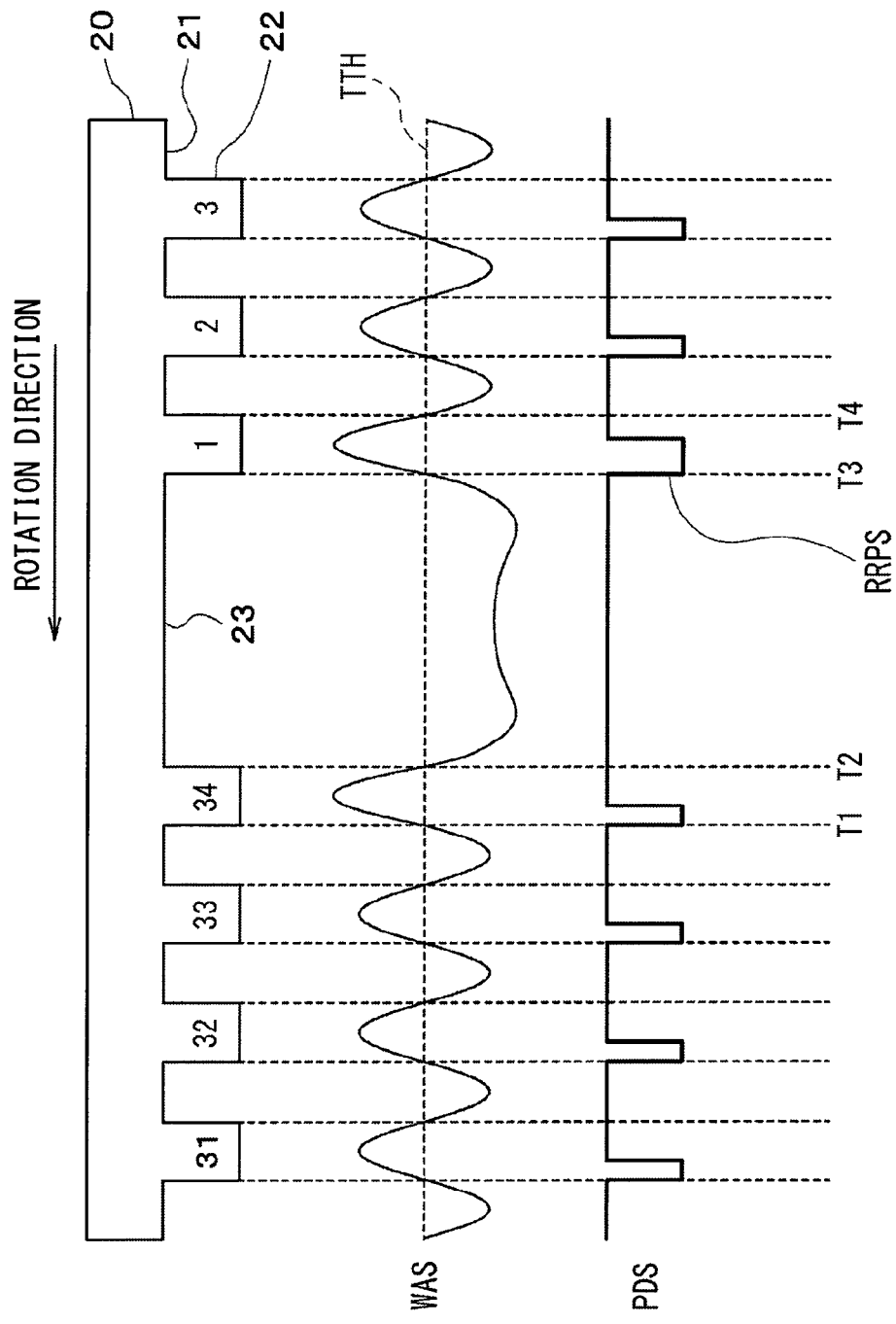
FIG. 6 is a timing chart illustrating a waveform signal (WAS), a detection signal (PDS), and a rotation reference position signal (RRPS) in a second embodiment.

In this embodiment, portions different from the first embodiment will be described. In this embodiment, as illustrated in FIG. 6, when a rotation detection sensor 30 outputs a rotation reference position signal (RRPS) at a time point T3, the rotation detection sensor 30 outputs the rotation reference position signal (RRPS) of a pulse width larger than a pulse width of a detection signal (PDS). For example, the rotation detection sensor 30 outputs the rotation reference position signal (RRPS) of the pulse width four times as large as the pulse width of the detection signal (PDS).

In a waveform processing unit 41, the thresholds of respective comparators 43 and 44 are set so that the first comparator 43 detects the detection signal (PDS) and the rotation reference position signal (RRPS), and the second comparator 44 detects only the rotation reference position signal (RRPS), on the basis of the amplitude of pulse widths of the respective signals. Therefore, the waveform processing unit 41 generates an angle signal (ANS) corresponding to the detection signal (PDS) and the rotation reference position signal (RRPS) by the first comparator 43, and generates a toothless signal (NTS) corresponding to the rotation reference position signal (RRPS) by the second comparator 44.

As described above, the pulse widths of the detection signal (PDS) and the rotation reference position signal (RRPS) are differentiated from each other with the result that the detection signal (PDS) and the rotation reference position signal (RRPS) can be discriminated from each other in the waveform processing unit 41. Since the amplitudes of the detection signal (PDS) and the rotation reference position signal (RRPS) are identical with each other, there is an advantage in that a margin of noise can increase.

Third Embodiment

Figure 7:
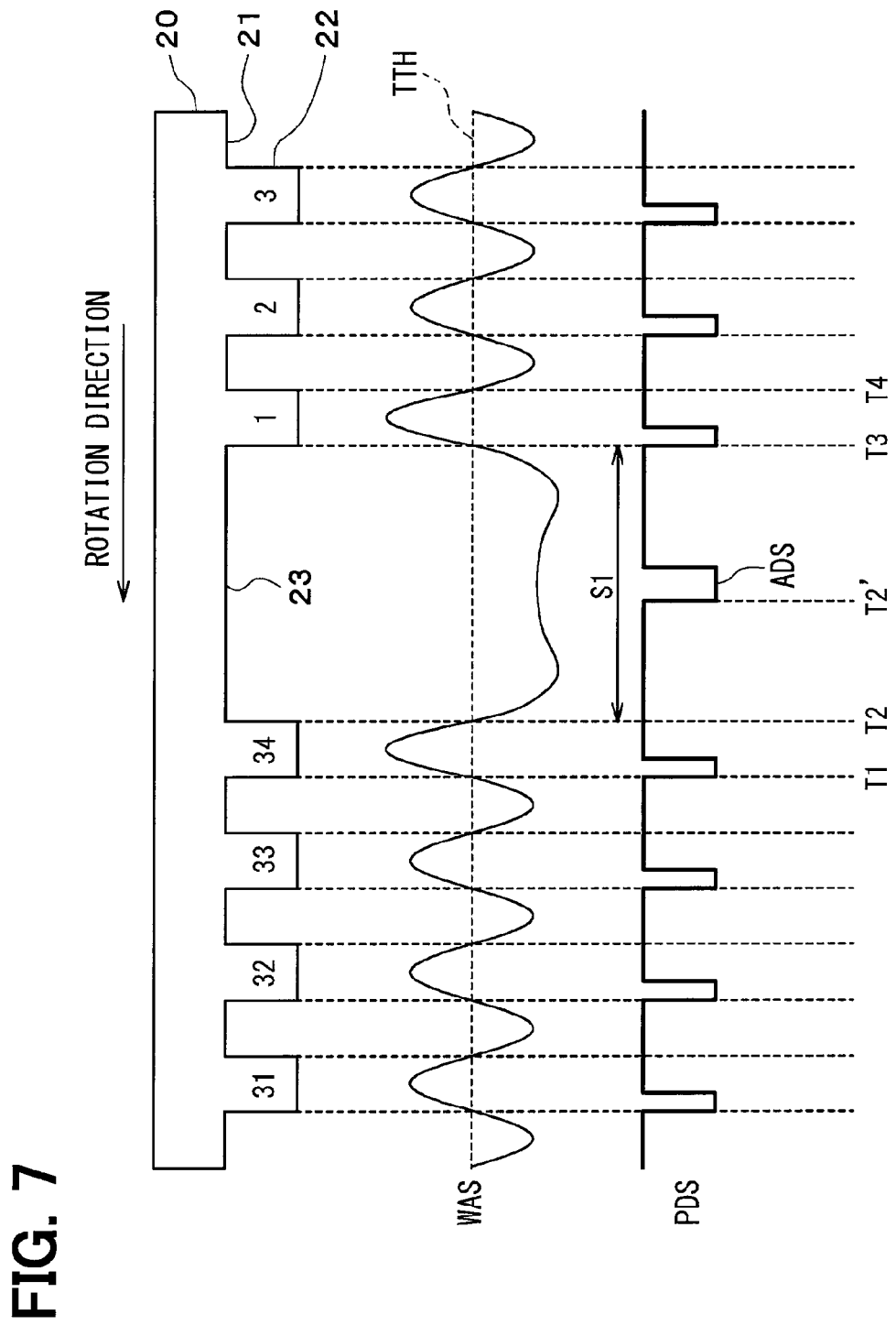
FIG. 7 is a timing chart illustrating a waveform signal (WAS), a detection signal (PDS), and an advance notice signal (ADS) in a third embodiment.

In this embodiment, portions different from the first and second embodiments will be described. As described above, a missing tooth part 23 has been already detected at a time point T2. Therefore, in this embodiment, as illustrated in FIG. 7, a rotation detection sensor 30 outputs an advance notice signal (ADS) at a time point T2' after the time point T2 and before a time point T3.

In other words, the rotation detection sensor 30 outputs the advance notice signal (ADS) indicating that a rotation reference position signal (RRPS) is output at the time point T3 to an ECU 40 in a period S1 after the time point T2 when the rotation reference position is detected and before the time point T3 at which switching from the missing tooth part 23 to the first projection 22 is detected. With the above operation, the rotation detection sensor 30 can more early and surely notify the ECU 40 that a next signal is the rotation reference position signal (RRPS) in advance in the period S1 during which the rotation detection sensor 30 has already detected the missing tooth part 23. For that reason, the ECU 40 can grasp a toothless signal (NTS) before acquiring the toothless signal (NTS), which can contribute to the engine control.

The ECU 40 may be configured to recognize the advance notice signal (ADS). For example, as illustrated in FIG. 4, the advance notice signal (ADS) may be extracted with the use of a second comparator 44 in a waveform processing unit 41. In that case, the amplitude and the pulse width of the advance notice signal (ADS) may be differentiated from those of a detection signal (PDS). It is needless to say that the amplitude and the pulse width of the rotation reference position signal (RRPS) may be differentiated from those of the detection signal (PDS) as in the respective embodiments.

The ECU 40 may input the detection signal (PDS) per se to the CPU 42, and detect the presence or absence of the advance notice signal (ADS) in the period S1. The CPU 42 recognizes that the next signal of the advance notice signal (ADS) is the rotation reference position signal (RRPS), that is, the toothless signal (NTS). In that case, there is no need to differentiate the amplitude and the pulse width of the rotation reference position signal (RRPS) from those of the detection signal (PDS). As illustrated in FIG. 5, even if the rotation unevenness of the signal rotor 20 occurs, since the advance notice signal (ADS) is not output from the rotation detection sensor 30 during a period where the rotation unevenness time occurs, the ECU 40 does not erroneously detect the toothless signal (NTS).

Fourth Embodiment

Figure 8:
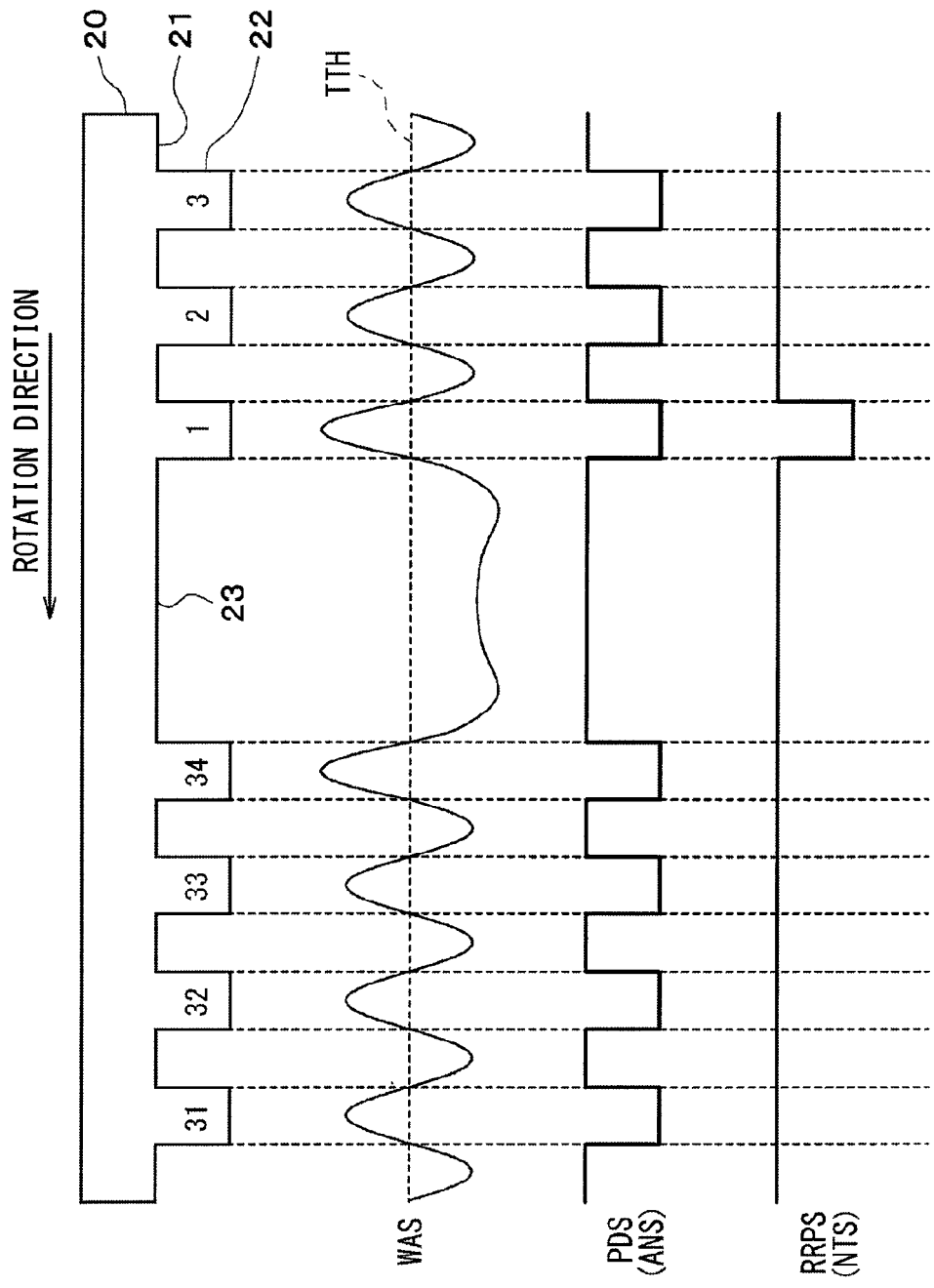
FIG. 8 is a timing chart illustrating a waveform signal (WAS), a detection signal (PDS), and a rotation reference position signal (RRPS) in a fourth embodiment.

In this embodiment, portions different from the first to third embodiments will be described. In this embodiment, as illustrated in FIG. 8, a rotation detection sensor 30 generates a detection signal (PDS) and a rotation reference position signal (RRPS) from a waveform signal (WAS), and outputs the respective signals. For that reason, the rotation detection sensor 30 has a terminal not shown for outputting the detection signal (PDS) as an angle signal (ANS), and a terminal not shown for outputting the rotation reference position signal (RRPS) as a toothless signal (NTS). The rotation detection sensor 30 outputs the detection signal (PDS) (angle signal: ANS) and the rotation reference position signal (RRPS) (toothless signal: NTS) from the respective dedicated terminals to the ECU 40.

The ECU 40 has terminals not shown corresponding to the respective signals, and is configured to receive the respective signals, separately. Therefore, in this embodiment, the ECU 40 may not have the waveform processing unit 41. As described above, the signal output by the rotation detection sensor 30 can be originally separated into the angle signal (ANS) and the toothless signal (NTS).

Other Embodiments

The configurations of the rotation detector described in the above respective embodiments are examples, and can be formed into other configurations without being limited to the configurations described above. For example, the rotation detector may be applied in a case of detecting not the crank angle but a rotation angle of the signal rotor fixed to a cam shaft of the engine 10. The configurations of the rotation detection sensor 30 and the ECU 40 are examples, and the rotation detection sensor 30 and the ECU 40 may be configured by other circuit elements.

In the first embodiment, the amplitude of the rotation reference position signal (RRPS) is set to be larger than the amplitude of the detection signal (PDS), which is an example for identifying the respective signals. Therefore, the amplitude of the rotation reference position signal (RRPS) may be set to be smaller than the amplitude of the detection signal (PDS). In this way, the rotation detection sensor 30 may be configured to differentiate the amplitude of the rotation reference position signal (RRPS) from the amplitude of the detection signal (PDS) for outputting. The ECU 40 may be configured to identify the respective signals.

Likewise, in the second embodiment, the pulse width of the rotation reference position signal (RRPS) is set to be larger than the pulse width of the detection signal (PDS), which is an example for identifying the respective signals. Therefore, the rotation detection sensor 30 may be configured to differentiate the pulse width of the detection signal (PDS) from the pulse width of the rotation reference position signal (RRPS) for outputting.

Further, in the fourth embodiment, the advance notice signal (ADS) described in the third embodiment may be output. In that case, the advance notice signal (ADS) can be output from the terminal for outputting, for example, the detection signal (PDS) (angle signal: ANS).

The application of the rotation detector is not limited to the internal combustion engine. Similarly, in the signal rotor 20, the rotation reference part indicative of the rotation reference position may not be the missing tooth part 23, but may be formed of another reference. In other words, the outer peripheral part 21 of the signal rotor 20 and the rotation reference part indicative of the rotation reference position in a part of the outer peripheral part 21 have only to be provided.

Fifth Embodiment

Figure 9:
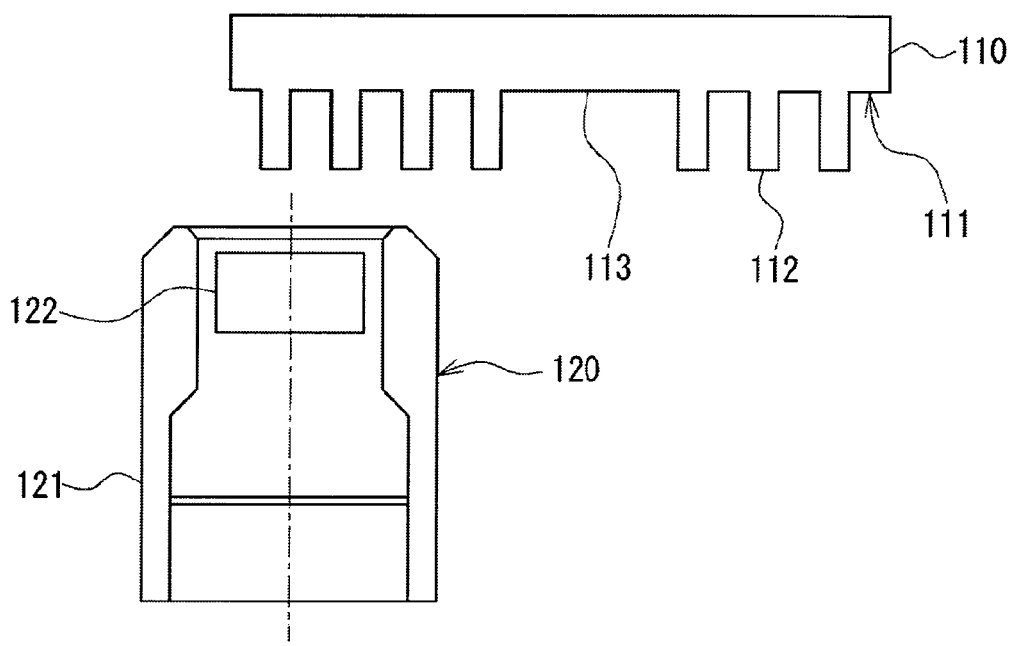
FIG. 9 is a diagram illustrating an arrangement relationship between a rotation detector and a signal rotor according to a fifth embodiment.

Hereinafter, a fifth embodiment will be described with reference to the drawings. A rotation detector is used, for example, as a crank angle determination device for an internal combustion engine. As illustrated in FIG. 9, a rotation detector 120 is disposed to face an outer peripheral part 111 of a disc-shaped signal rotor 110 fixed to a crank shaft of an engine which is an internal combustion engine. In FIG. 9, the outer peripheral part 111 of the disc-shaped signal rotor 110 is linearly developed.

On the outer peripheral part 111 of the signal rotor 110, multiple projections 112 are disposed at regular intervals, and a missing tooth part 113 in which one or multiple projections 112 are missing is disposed at a specific crank angle. The missing tooth part 113 corresponds to a rotation reference position of the signal rotor 110, that is, a reference angle of the crank angle. In this embodiment, for example, 34 projections 112 are disposed on the outer peripheral part 111 of the signal rotor 110. The missing tooth part 113 is a portion of the outer peripheral part 111 of the signal rotor 110 in which, for example, two projections 112 are missing.

The rotation detector 120 includes a bias magnet 121 and a sensor chip 122 disposed at a predetermined position with respect to the bias magnet 121. The bias magnet 121 functions to increase a detection sensitivity of a magnetic field of the rotation detector 120 by a certain amount. The sensor chip 122 is configured to output a pulsed detection signal (PDS) corresponding to a position of the outer peripheral part, that is, the crank angle with the rotation of the signal rotor 110.

Figure 10:
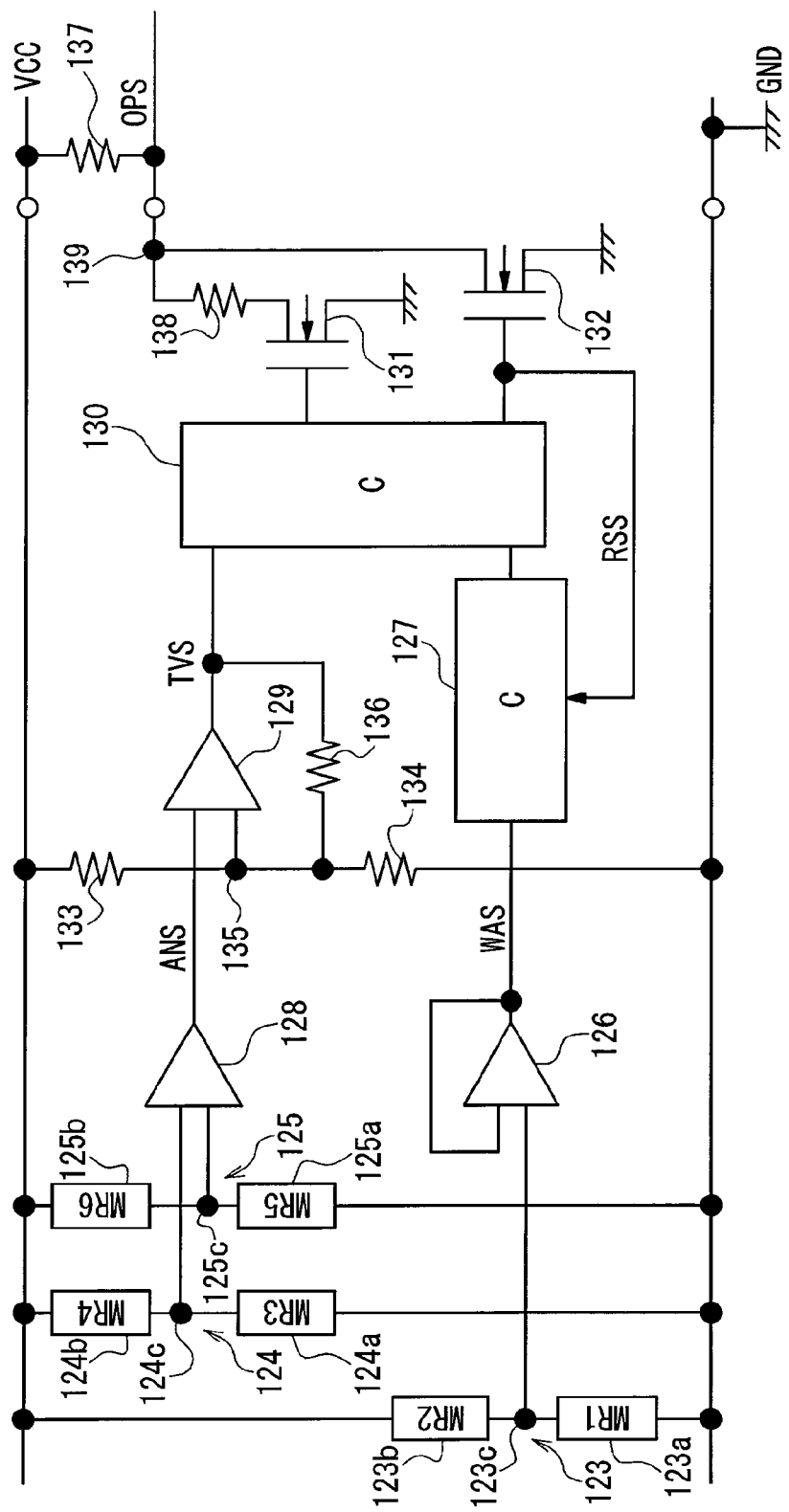
FIG. 10 is a diagram illustrating a circuit configuration of the rotation detector.

Specifically, as illustrated in FIG. 10, the sensor chip 122 includes first to third resistors 123 to 125, a voltage follower circuit 126, a peak/bottom detection determination/holding circuit 127, an operational amplifier 128, a comparator 129, an angle signal determination circuit 130, a first output transistor 131, and a second output transistor 132.

The first to third resistors 123 to 125 are a sensing part configured to output a waveform signal (WAS) according to the rotation of the signal rotor 110. The first resistor 123 is a sensing part for easily detecting the missing tooth part 113 of the signal rotor 110. The second resistor 124 and the third resistor 125 are a sensing part for detecting the unevenness of the outer peripheral part 111 of the signal rotor 110.

Figure 11:
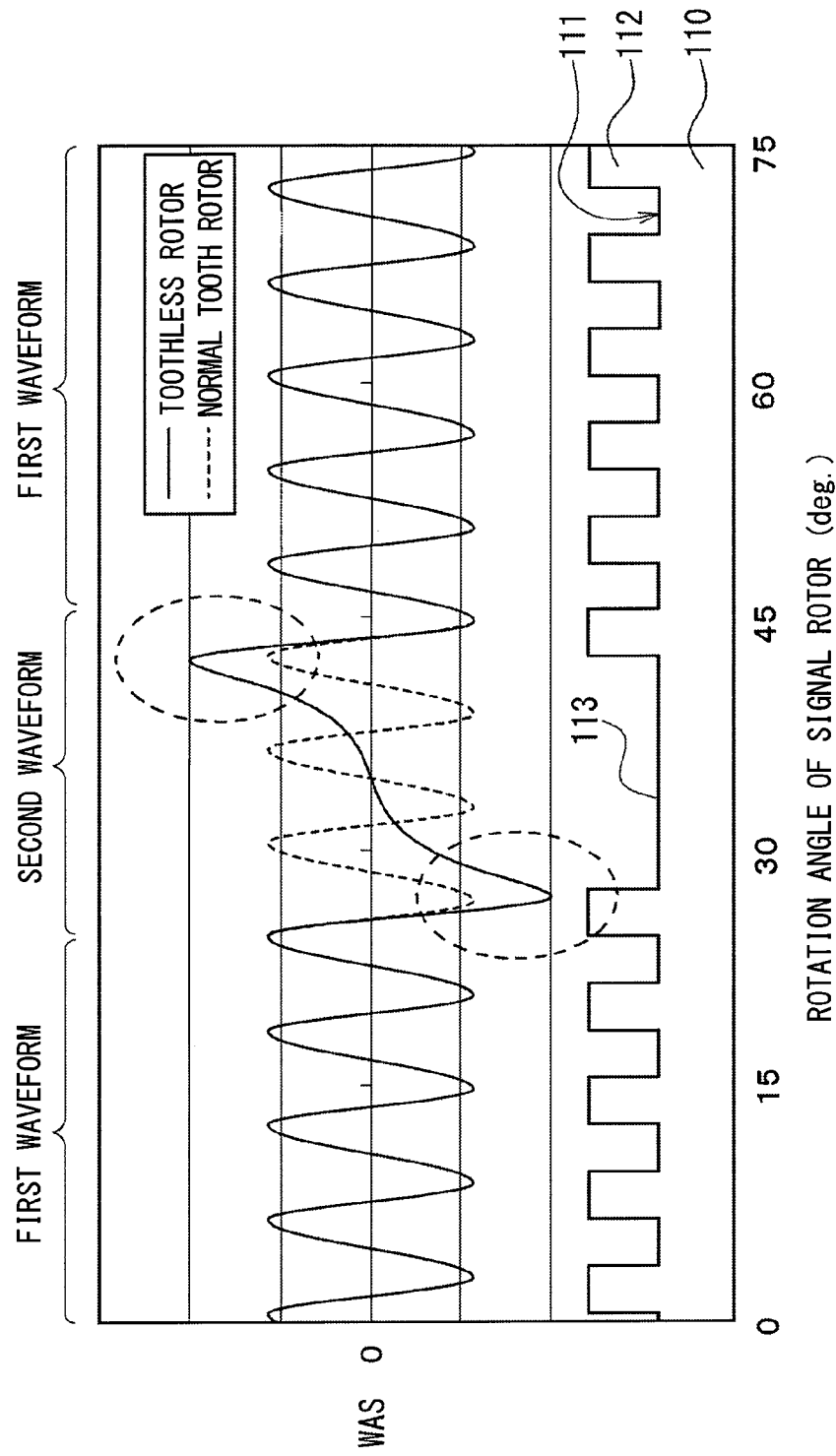
FIG. 11 is a diagram illustrating a first waveform and a second waveform contained in the waveform signal (WAS).

The first resistor 123 is configured to have a first magnetic resistive element 123a (MR1) and a second magnetic resistive element 123b (MR2) connected in series with each other between a power supply (VCC) and a ground (GND). The first resistor 123 detects a change in the resistance value when the first magnetic resistive element 123a and the second magnetic resistive element 123b are affected by a magnetic field with the rotation of the signal rotor 110. The first resistor 123 outputs a voltage of a midpoint 123c between the first magnetic resistive element 123a and the second magnetic resistive element 123b as the waveform signal (WAS) on the basis of the change in the resistance value. As illustrated in FIG. 11, the first resistor 123 outputs a signal including a first waveform corresponding to the outer peripheral part 111 on which the projections 112 are formed, and a second waveform corresponding to switching from the outer peripheral part 111 to the missing tooth part 113 and larger in the amplitude than the first waveform, as the waveform signal (WAS).

The first waveform is a waveform appearing in correspondence with the unevenness of the signal rotor 110 where no missing tooth part 113 is provided in the signal rotor 110 as indicated by a waveform of a broken line in FIG. 11. On the other hand, the second waveform is a waveform having an amplitude larger than the amplitude of the first waveform in correspondence with the projections 112 located before and after the missing tooth part 113, as indicated by a waveform of a solid line in FIG. 11. In other words, the second waveform corresponds to both of switching from the projections 112 to the missing tooth part 113 and switching from the missing tooth part 113 to the projections 112. The amplitude of the second waveform corresponding to switching from the projections 112 to the missing tooth part 113 corresponds to a bottom value of the amplitude of the waveform signal (WAS). The amplitude of the second waveform corresponding to switching from the missing tooth part 113 to the projections 112 corresponds to a peak value of the amplitude of the waveform signal (WAS).

Since the signal rotor 110 is provided with the missing tooth part 113, the waveform signal (WAS) is a waveform combining the first waveform corresponding to the unevenness caused by the projections 112 with the second waveform corresponding to the missing tooth part 113, as indicated by the waveform of the solid line in FIG. 11. In FIG. 11, the "toothless rotor" shows the signal rotor 110 provided with the missing tooth part 113, and the "normal tooth rotor" shows the signal rotor provided with no missing tooth part 113.

The second resistor 124 is configured to have a third magnetic resistive element 124a (MR3) and a fourth magnetic resistive element 124b (MR4) connected in series with each other between the power supply and the ground. The second resistor 124 outputs the voltage of a midpoint 124c between the third magnetic resistive element 124a and the fourth magnetic resistive element 124b as the first detection signal (PDS) on the basis of a change in the resistance value when the third magnetic resistive element 124a and the fourth magnetic resistive element 124b are affected by the magnetic field with the rotation of the signal rotor 110.

The third resistor 125 is configured to have a fifth magnetic resistive element 125a (MR5) and a sixth magnetic resistive element 125b (MR6) connected in series with each other between the power supply and the ground. The third resistor 125 outputs the voltage of a midpoint 25c between the fifth magnetic resistive element 125a and the sixth magnetic resistive element 125b as the second detection signal (PDS) on the basis of a change in the resistance value when the fifth magnetic resistive element 125a and the sixth magnetic resistive element 125b are affected by the magnetic field with the rotation of the signal rotor 110.

Figure 12:
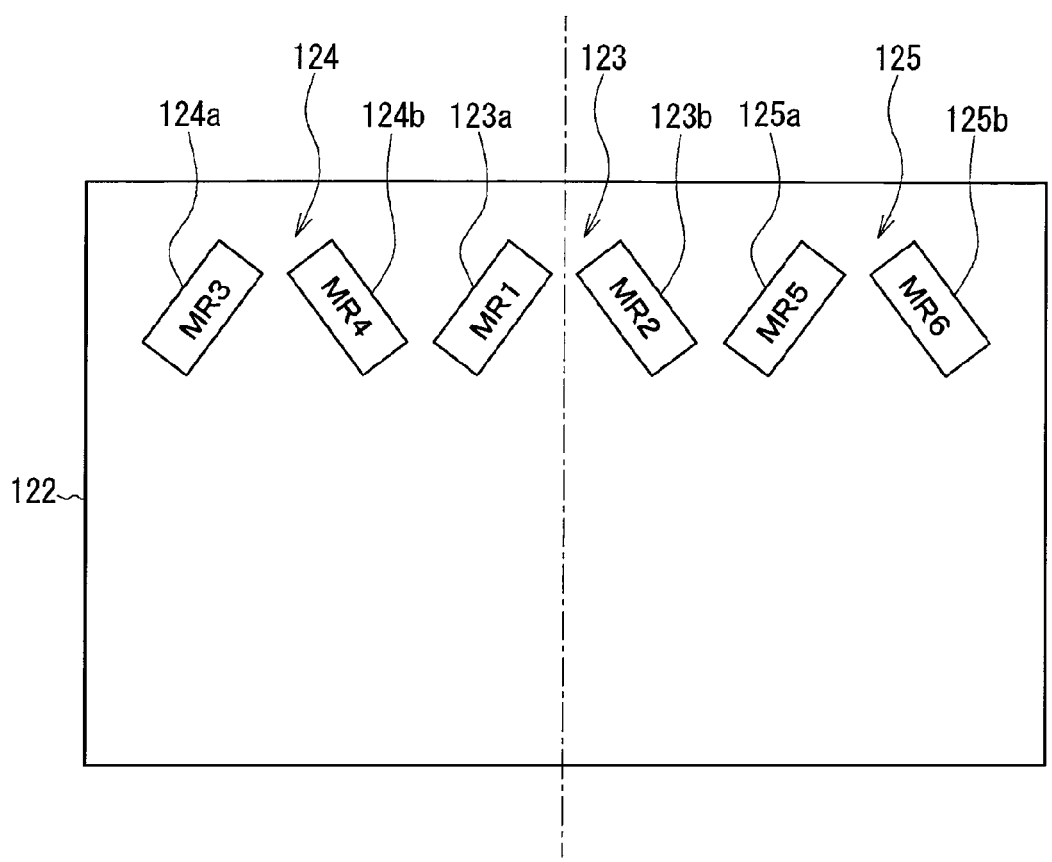
FIG. 12 is a top view of a sensor chip on which respective resistors are arranged.

As described above, the respective resistor pairs 123 to 125 configure the respective half-bridge circuits. As illustrated in FIG. 12, the first resistor 123 is disposed in the center of the sensor chip 122 on the signal rotor 110 side. The second resistor 124 and the third resistor 125 are disposed to sandwich the first resistor 123 therebetween on an end of the sensor chip 122 on the signal rotor 110 side.

The first resistor 123 is disposed in a state where the first magnetic resistive element 123a and the second magnetic resistive element 123b are at angles of 45° and −45° with respect to a magnetic center of a bias magnetic field, respectively, that is, in a divergent shape. Likewise, the third magnetic resistive element 124a and the fourth magnetic resistive element 124b in the second resistor 124, and the fifth magnetic resistive element 125a and the sixth magnetic resistive element 125b in the third resistor 125 are disposed in a divergent shape.

The voltage follower circuit 126 shown in FIG. 10 is an amplifier circuit that receives the waveform signal (WAS) from the first resistor 123, subjects the waveform signal to impedance conversion, and outputs the converted signal to the peak/bottom detection determination/holding circuit 127. In other words, the voltage follower circuit 126 converts the waveform signal into the waveform signal (WAS) obtained by amplifying a change in the resistance value of the first resistor 123 at a predetermined gain.

The peak/bottom detection determination/holding circuit 127 receives the waveform signal (WAS) from the voltage follower circuit 126, detects the peak value and the bottom value of the amplitude of the waveform signal (WAS), and holds the detected peak value and bottom value. As described above, since the waveform signal (WAS) is configured by the first waveform and the second waveform, the peak/bottom detection determination/holding circuit 127 detects the peak value or the bottom value of the amplitude of the second waveform larger than the amplitude of the first waveform. The peak/bottom detection determination/holding circuit 127 holds the peak value and the bottom value until being reset.

The operational amplifier 128 is a differential amplifier circuit that receives the first detection signal (PDS) from the second resistor 124, receives the second detection signal (PDS) from the third resistor 125, and amplifies a signal difference, that is, a voltage difference between the first detection signal (PDS) and the second detection signal (PDS). In other words, the operational amplifier 128 generates an angle signal (ANS) of a waveform corresponding to the rotation angle of the signal rotor 110 to output the generated angle signal to the comparator 129.

The comparator 129 is a circuit that compares the amplitude of the angle signal (ANS) with a binarization threshold (TTH) to generate a binarized angle signal (ANS). For example, if the amplitude of the angle signal (ANS) is larger than the binarization threshold (TTH), the comparator 129 outputs a signal of Lo as the binarized angle signal (ANS). If the amplitude of the angle signal (ANS) is smaller than the binarization threshold (TTH), the comparator 129 outputs a signal of Hi as the binarized angle signal (ANS). Hereinafter, the "binarized angle signal (ANS)" is also called "binarized signal (TVS)".

The binarization threshold (TTH) is set by a resistance ratio of a first resistor 133 and a second resistor 134 connected in series with each other between the power supply and the ground, and a third resistor 136 that connects a midpoint 135 between the first resistor 133 and the second resistor 134 to an output terminal of the comparator 129. That is, a voltage value of the midpoint 135 between the first resistor 133 and the second resistor 134 corresponds to the binarization threshold (TTH).

The angle signal determination circuit 130 is a circuit part having a binarized signal output function and a circuit reference position output function. The binarized signal output function is a function that the angle signal determination circuit 130 receives the binarized signal (TVS) from the comparator 129, and outputs the detection signal (PDS) corresponding to the binarized signal (TVS) to the external. The angle signal determination circuit 130 controls the first output transistor 131 for the purpose of outputting the detection signal (PDS) to the external. For example, if the binarized signal (TVS) is a Hi signal, the angle signal determination circuit 130 outputs the Hi signal to the first output transistor 131, and if the binarized signal (TVS) is a Lo signal, the angle signal determination circuit 130 outputs the Lo signal to the first output transistor 131.

In the rotation reference position output function, the angle signal determination circuit 130 receives the peak value or the bottom value of the amplitude of the waveform signal (WAS) from the peak/bottom detection determination/holding circuit 127, and also acquires the rotation reference position on the basis of the peak value or the bottom value. In the rotation reference position output function, the angle signal determination circuit 130 outputs a rotation reference position signal (RRPS) indicative of position information on the rotation reference position to the external on the basis of a rising edge or a falling edge of the binarized signal (TVS). The angle signal determination circuit 130 controls the second output transistor 132 for the purpose of outputting the rotation reference position signal (RRPS) to the external. For example, the angle signal determination circuit 130 outputs the Hi signal to the second output transistor 132 when outputting the rotation reference position signal (RRPS) to the external.

The Hi signal output to the second output transistor 132 by the angle signal determination circuit 130 functions as a reset signal (RSS) for resetting the peak value or the bottom value held in the peak/bottom detection determination/holding circuit 127.

The first output transistor 131 is switching means having a gate controlled by the angle signal determination circuit 130 to output an output signal (OPS) to the external. The first output transistor 131 is connected to a series connection of a fourth resistor 137 and a fifth resistor 138 connected to the power supply, between the fifth resistor 138 and the ground.

The first output transistor 131 turns on when the Hi signal is input to a gate of the first output transistor 131 from the angle signal determination circuit 130. In this situation, when the first output transistor 131 is on, a voltage (for example, 2.5 V) of a midpoint 139 between the fourth resistor 137 and the fifth resistor 138 is output to the external as the output signal (OPS). When the first output transistor 131 is off, a voltage (for example, 5 V) of the power supply is output to the external as the output signal (OPS).

The second output transistor 132 is switching means having a gate controlled by the angle signal determination circuit 130 to output the rotation reference position signal (RRPS) indicative of the position information on the rotation reference position. The second output transistor 132 is connected to the midpoint 139 and the ground.

The second output transistor 132 turns on when the Hi signal is input to a gate of the second output transistor 132 from the angle signal determination circuit 130. In this situation, when the second output transistor 132 is on, since the midpoint 139 is connected to the ground, the voltage (for example, 0 V) of the ground is output to the external as the rotation reference position signal (RRPS). The overall configuration of the rotation detector 120 according to this embodiment is described above.

Next, the operation of the rotation detector 120 will be described. First, as illustrated in FIG. 13, when the signal rotor 110 rotates, the rotation detector 120 acquires the waveform signal (WAS) and the angle signal (ANS) on the basis of a change in the gap between the rotation detector 120 and the outer peripheral part 111 of the signal rotor 110.

Figure 13:
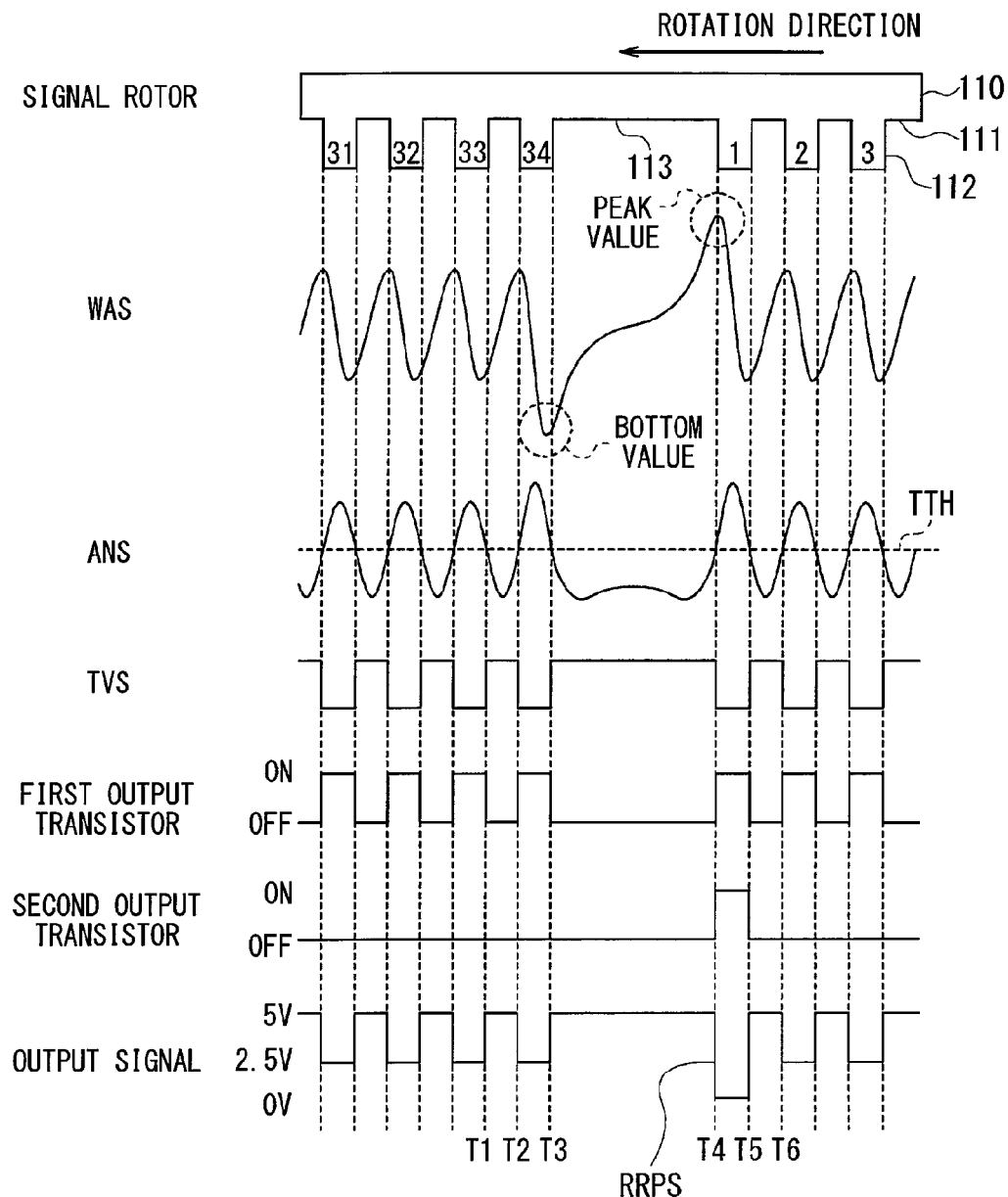
FIG. 13 is a timing chart illustrating the operation of the rotation detector.

In FIG. 13, the outer peripheral part 111 of the disc-shaped signal rotor 110 is linearly drawn. The projections 112 on an upstream side of the missing tooth part 113 in the rotation in a direction of rotating the signal rotor 110 are called first, second, and third projections in order. On the other hand, the projections 112 on a downstream side of the missing tooth part 113 in the rotation are called 34th, 33rd, 32nd, and 31st projections in order.

In the peak/bottom detection determination/holding circuit 127, the amplitude of the waveform signal (WAS) is monitored. When the signal rotor 110 rotates in a direction indicated in FIG. 13, the bottom value is first held in the peak/bottom detection determination/holding circuit 127, and the peak value is then held. The peak value and the bottom value are output to the angle signal determination circuit 130 from the peak/bottom detection determination/holding circuit 127.

In the comparator 129, the amplitude of the angle signal (ANS) is compared with the binarization threshold (TTH) to generate a binarized signal (binarized angle signal (ANS)). If the amplitude of the angle signal (ANS) is larger than the binarization threshold (TTH), the binarized signal (TVS) of, for example, Lo is generated by the comparator 129, and output to the angle signal determination circuit 130. If the amplitude of the angle signal (ANS) is smaller than the binarization threshold (TTH), the binarized signal (TVS) of, for example, Hi is generated by the comparator 129, and output to the angle signal determination circuit 130.

The amplitude of the angle signal (ANS) corresponding to the 34th projection 112 when switching from the 34th projection 112 to the missing tooth part 113 is larger than the amplitudes of the angle signal (ANS) corresponding to the respective projections 112 from the second projection to the 33rd projection. Likewise, the amplitude of the angle signal (ANS) corresponding to the first projection 112 when switching from the missing tooth part 113 to the first projection 112 is larger than the amplitudes of the angle signal (ANS) corresponding to the respective projections 112 from the second projection to the 33rd projection. This is because the change in the gap between the rotation detector 120 and the outer peripheral part 111 of the signal rotor 110 is not kept constant.

As described above, the peak value or the bottom value of the waveform signal (WAS), and the binarized signal (TVS) are input to the angle signal determination circuit 130 at any time. With this input, in the angle signal determination circuit 130, a process for outputting the binarized signal (TVS) and the rotation reference position signal (RRPS) to the external as the output signal (OPS) is performed.

Specifically, at a time point T1, since the angle signal (ANS) falls below the binarization threshold (TTH), the binarized signal (TVS) of Hi is input to the angle signal determination circuit 130. With this input, the first output transistor 131 is turned off by the angle signal determination circuit 130. At the time point T1, the peak value and the bottom value held in the peak/bottom detection determination/holding circuit 127 are reset, and the rotation reference position is not detected. Therefore, the second output transistor 132 is turned off by the angle signal determination circuit 130. With this operation, since a supply voltage (5 V) is applied to the midpoint 139 in the circuit shown in FIG. 10, the supply voltage is output to the external as the output signal (OPS).

Subsequently, at a time point T2 of FIG. 13, since the angle signal (ANS) exceeds the binarization threshold (TTH), the binarized signal (TVS) of Lo is input to the angle signal determination circuit 130. With this input, the first output transistor 131 is turned on by the angle signal determination circuit 130. Since the rotation reference position is not acquired in the angle signal determination circuit 130, the second output transistor 132 is also turned off. With the above operation, since a voltage (2.5 V) corresponding to a resistance ratio of the fourth resistor 137 and the fifth resistor 138 is applied to the midpoint 139 in the circuit shown in FIG. 10, the voltage is output to the external as the output signal (OPS).

Then, after the time point T2, switching from the projections 112 to the missing tooth part 113 is detected in the angle signal determination circuit 130. The bottom value of the amplitude of the waveform signal (WAS) is detected and held by the peak/bottom detection determination/holding circuit 127, and output to the angle signal determination circuit 130. As a result, at a time point T3, the rotation reference position is acquired in the angle signal determination circuit 130.

At a time point T4, like the time point T2, the outer peripheral part 111 of the signal rotor 110 switches from the missing tooth part 113 to the projections 112. With the above switching, since the angle signal (ANS) exceeds the binarization threshold (TTH), the binarized signal (TVS) falls down to Lo from Hi. The first output transistor 131 and the second output transistor 132 are turned on by the angle signal determination circuit 130 on the basis of a falling edge of the binarized signal (TVS). As a result, since the midpoint 139 is connected to the ground in the circuit shown in FIG. 10, a voltage (0 V) of the ground is output to the external as the rotation reference position signal (RRPS) indicative of the position information on the rotation reference position. In this embodiment, a signal of the amplitude larger than the amplitude of the detection signal (PDS) corresponding to the binarized signal (TVS) is output as the rotation reference position signal (RRPS).

Further, the second output transistor 132 is turned on to input the reset signal (RSS) to the peak/bottom detection determination/holding circuit 127 from the angle signal determination circuit 130. With the above operation, the peak value and the bottom value held in the peak/bottom detection determination/holding circuit 127 are reset. As described above, since the second output transistor 132 is turned on after the time point T4, the peak value is not held, and only the bottom value is used in the peak/bottom detection determination/holding circuit 127. When a rotating direction of the signal rotor 110 is reversed, only the peak value is detected and held, and used.

Thereafter, at a time point T5, since the angle signal (ANS) falls below the binarization threshold (TTH), the first output transistor 131 and the second output transistor 132 turn off. After the time point T5, the detection signal (PDS) corresponding to the binarized signal (TVS) is output.

Then, the engine ECU receives the detection signal (PDS) and the rotation reference position signal (RRPS) from the rotation detector 120, to thereby acquire the rotation angle of the signal rotor 110 and the rotation reference position which is a position of the missing tooth part 113 in the signal rotor 110 as a reference angle of the crank angle. The engine ECU controls a fuel injection valve and an ignition plug with the use of the rotation reference position.

As described above, this embodiment is characterized in that the waveform signal (WAS) is detected by the first resistor 123 different from the second resistor 124 and the third resistor 125 for detecting the rotation angle of the signal rotor 110. As a result, the peak value or the bottom value of the amplitude of the waveform signal (WAS) can be detected by the peak/bottom detection determination/holding circuit 127 on the basis of a difference in the magnitude between the amplitude of the first waveform and the amplitude of the second waveform contained in the waveform signal (WAS). For that reason, even if the rotation speed of the signal rotor 110 is instantaneously changed to generate the rotation unevenness in the signal rotor 110, the rotation reference position signal (RRPS) indicative of the rotation reference position can be prevented from being generated in the angle signal determination circuit 130.

The rotation reference position can be detected without depending on a precision in the shape of the outer peripheral part 111 and the missing tooth part 113 of the signal rotor 110, that is, without depending on a precision in the gap between the first resistor 123 and the signal rotor 110. Therefore, the erroneous detection of the rotation reference position of the signal rotor 110 can be prevented, and a detection precision in the rotation reference position of the signal rotor 110 can be improved.

The signal rotor 110 corresponds to "rotating body", and the missing tooth part 113 corresponds to "rotation reference part". The voltage follower circuit 126 corresponds to "amplifier", and the peak/bottom detection determination/holding circuit 127 corresponds to "peak/bottom detection unit". Further, the operational amplifier 128, the comparator 129, and the respective resistors 33, 34, and 36 correspond to "binarizing unit", and the angle signal determination circuit 130 corresponds to "determination unit".

Sixth Embodiment

In this embodiment, portions different from the fifth embodiment will be described. In the fifth embodiment, the missing tooth part 113 of the signal rotor 110 is indicative of the rotation reference position. On the other hand, in this embodiment, a ridge disposed on a part of an outer peripheral part 111 of a signal rotor 110 is configured to be indicative of a rotation reference position.

Figure 14:
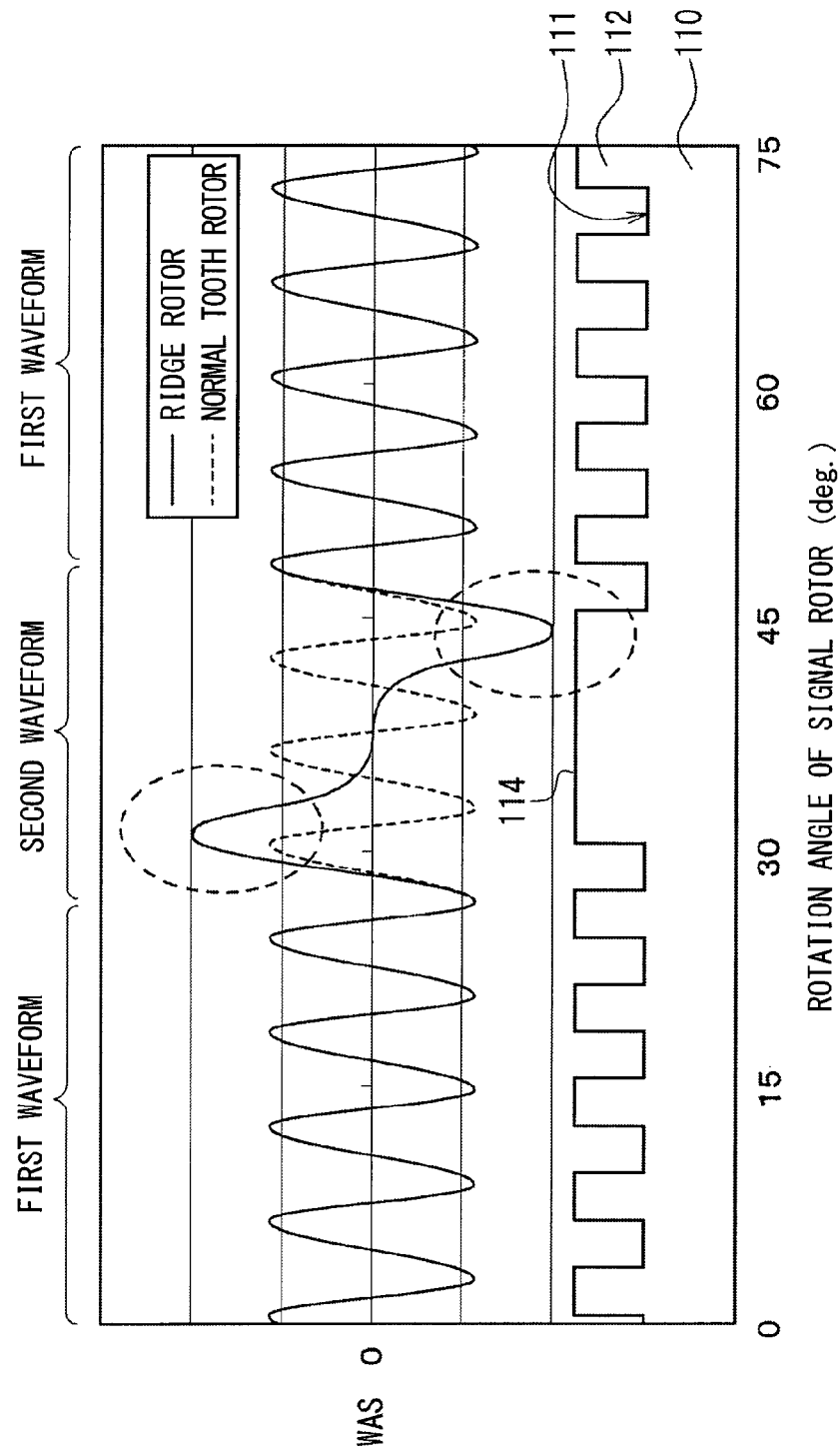
FIG. 14 is a diagram illustrating a waveform signal (WAS) corresponding to a signal rotor according to a sixth embodiment.

Specifically, as illustrated in FIG. 14, a waveform signal (WAS) corresponding to a ridge part 114 of the signal rotor 110 is detected by a first resistor 123. For example, a peak value of the waveform signal (WAS) appears when switching from a concave portion of the signal rotor 110 to the ridge part 114. A bottom value of the waveform signal (WAS) appears when switching from the ridge part 114 of the signal rotor 110 to the concave portion. Any one of the peak value and the bottom value appears ahead according to a rotating direction of the signal rotor 110. A rotation reference position signal (RRPS) outputs to the external by an angle signal determination circuit 130 on the basis of the peak value or the bottom value of the amplitude of the waveform signal (WAS).

Figure 15:
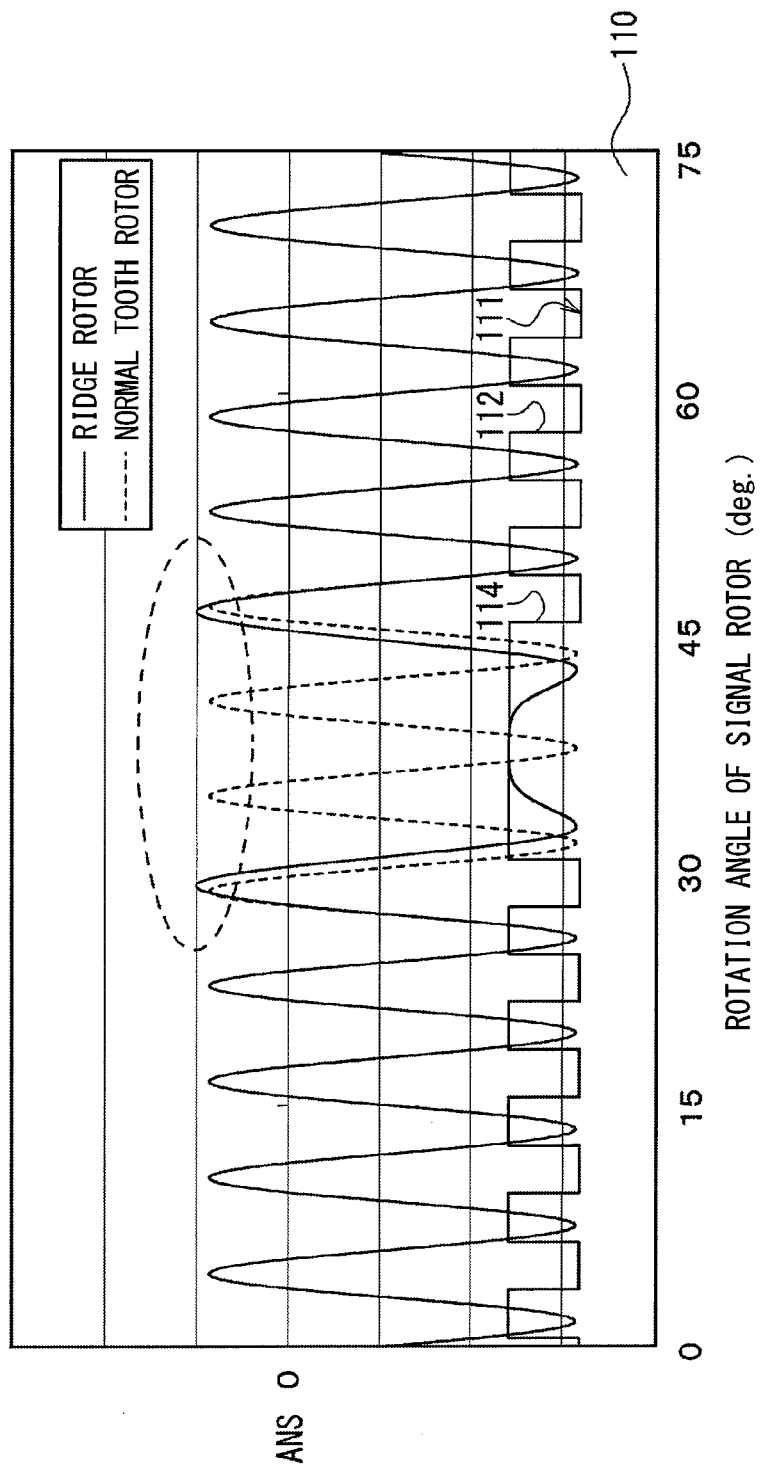
FIG. 15 is a diagram illustrating an angle signal (ANS) corresponding to the signal rotor according to the sixth embodiment.

On the other hand, as illustrated in FIG. 15, the amplitude of an angle signal (ANS) obtained by the operational amplifier 128 does not so much change when switching between the ridge part 114 and the concave portion. The angle signal (ANS) is binarized by the comparator 129, and output to the external by the angle signal determination circuit 130. As described above, a configuration in which the ridge part 114 is provided as means for indicating the rotation reference position of the signal rotor 110 can also acquire the angle signal (ANS) and the rotation reference position signal (RRPS) which are binarized as in the fifth embodiment.

In FIGS. 14 and 15, a solid line indicates the signal rotor 110 having the ridge part 114, and a broken line indicates the signal rotor having no missing tooth part 113. The ridge part 114 corresponds to "rotation reference part".

Seventh Embodiment

Figure 16:
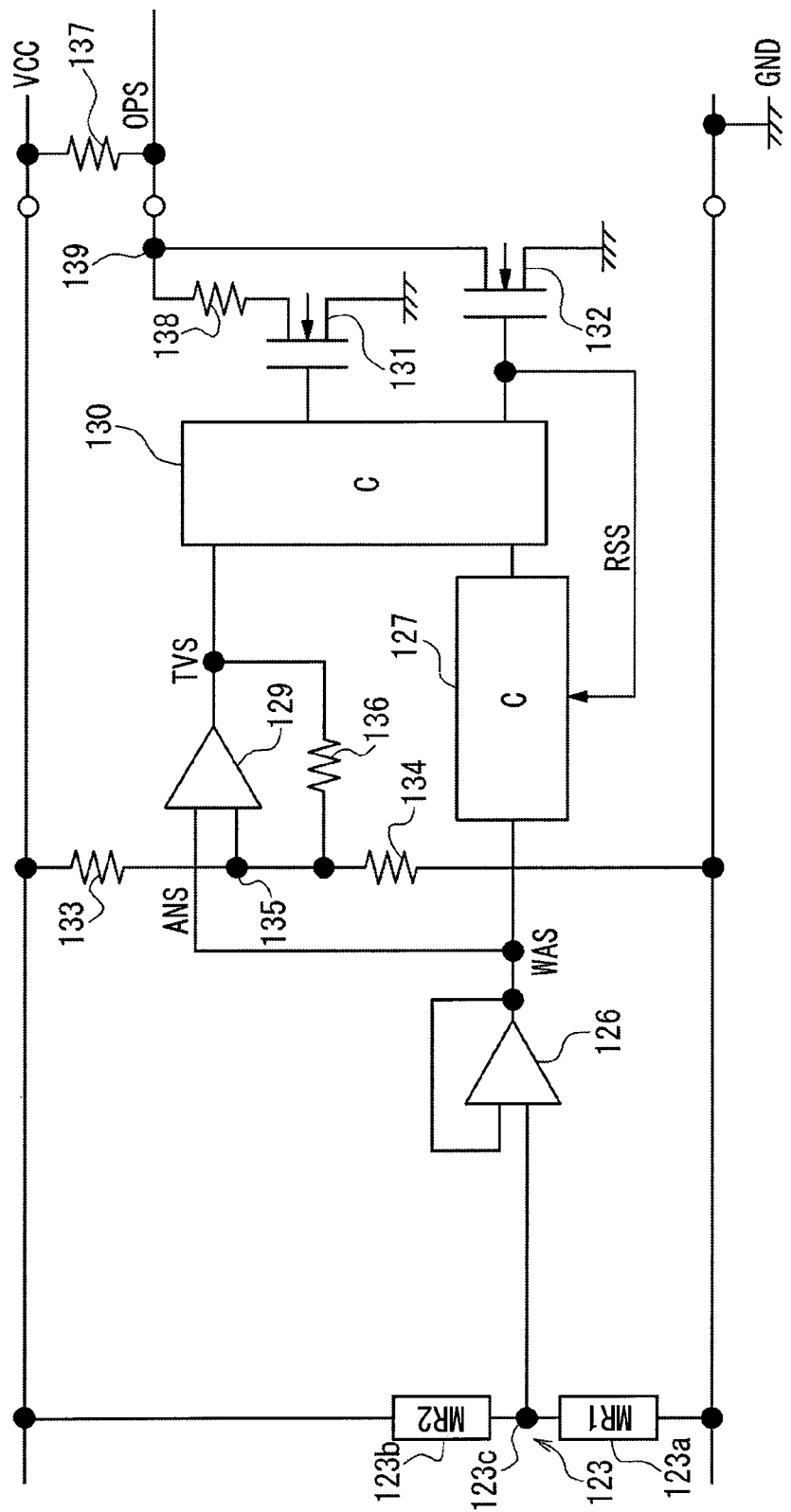
FIG. 16 is a diagram illustrating a circuit configuration of a rotation detector according to a seventh embodiment.

In this embodiment, portions different from those in the first and sixth embodiments will be described. As illustrated in FIG. 16, the rotation detector includes only a first resistor 123 as a sensing part for detecting the rotation of a signal rotor 110. In other words, in this embodiment, the second resistor 124 and the third resistor 125 are not provided in the rotation detector. Therefore, the rotation detector detects a rotation angle and a rotation reference position of the signal rotor 110 on the basis of the output of the first resistor 123.

For that reason, a voltage follower circuit 126 is connected to not only a peak/bottom detection determination/holding circuit 127 but also a comparator 129. With the above configuration, a waveform signal (WAS) input from the voltage follower circuit 126 to the comparator 129 becomes an angle signal (ANS). As described above in FIG. 11, the waveform signal (WAS) includes a first waveform corresponding to an outer peripheral part 111 formed with projections 112 in the signal rotor 110. The waveform signal (WAS) including the first waveform is input to the comparator 129 as the angle signal (ANS). Therefore, the comparator 129 compares the amplitude of the angle signal (ANS) input from the voltage follower circuit 126 with a binarization threshold (TTH) to generate the binarized angle signal (ANS). The resistance values of respective resistors 33, 34, and 36 are set according to the angle signal (ANS).

As described above, the rotation detector can have a minimum configuration having one first resistor 123. Even in the above configuration, both of the rotation angle and the rotation reference position of the signal rotor 110 can be acquired from the signal output from the first resistor 123.

Other Embodiments

The configuration of the rotation detector 120 in the above respective embodiments is an example, and can be replaced with other configurations without being limited to the configurations described above. For example, the configuration in which the detection signal (PDS) and the rotation reference position signal (RRPS) are output to the external is not limited to the first output transistor 131. For example, a configuration in which the rotation reference position signal (RRPS) having the pulse width larger than the pulse width of the detection signal (PDS) is output may be applied. Conversely, the rotation detector 120 may output the rotation reference position signal (RRPS) of the pulse width smaller than the pulse width of the detection signal (PDS).

On the other hand, in the fifth embodiment, the amplitude of the rotation reference position signal (RRPS) is set to be larger than the amplitude of the detection signal (PDS), which is an example for identifying the respective signals. Therefore, the amplitude of the rotation reference position signal (RRPS) may be set to be smaller than the amplitude of the detection signal (PDS). In this way, the rotation detector 120 may be configured to differentiate the amplitude of the rotation reference position signal (RRPS) from the amplitude of the detection signal (PDS) for outputting.

Since the information on the rotation reference position has already been obtained before the rotation reference position signal (RRPS) is output to the external from the angle signal determination circuit 130, a configuration in which an advance notice signal (ADS) indicating that the rotation reference position signal (RRPS) is output, for example, between the time point T3 and the time point T4 in FIG. 13 is output to the external may be applied. With the above configuration, the engine ECU can grasp the rotation reference position signal (RRPS) before acquiring the rotation reference position signal (RRPS), and the advance information can be helpful in the engine control.

Further, the rotation detector 120 may have a terminal not shown for outputting the detection signal (PDS) as the angle signal (ANS), and a terminal not shown for outputting the rotation reference position signal (RRPS). With the above configuration, the rotation detector 120 can output the detection signal (PDS) (binarized angle signal: ANS) and the rotation reference position signal (RRPS) from the respective dedicated terminals to the engine ECU.

The application of the rotation detector 120 is not limited to the internal combustion engine. Similarly, in the signal rotor 110, the rotation reference part indicative of the rotation reference position may not be the missing tooth part 113 or the ridge part 114, but may be formed of another reference. In other words, the outer peripheral part 111 of the signal rotor 110 and the rotation reference part indicative of the rotation reference position in a part of the outer peripheral part 111 have only to be provided.

The invention claimed is:

1. A rotation detector configured to detect a rotation reference position with respect to rotation of a rotating body having an outer peripheral part and a rotation reference part indicative of a rotation reference position in a part of the outer peripheral part, the rotation detector comprising:
   a first resistor that has a first magnetic resistive element and a second magnetic resistive element connected in series with each other, and detects a change in resistance value when the first magnetic resistive element and the second magnetic resistive element are affected by a magnetic field with the rotation of the rotating body;
   an amplifier that converts a change in the resistance value of the first resistor into a waveform signal;
   a peak/bottom detection unit that receives the waveform signal to detect a peak value or a bottom value of an amplitude of the waveform signal; and
   a determination unit that receives the peak value or the bottom value detected by the peak/bottom detection unit to acquire the rotation reference position on the basis of the peak value or the bottom value, wherein
   the first resistor outputs a signal including a first waveform corresponding to the outer peripheral part and a second waveform corresponding to switching from the outer peripheral part to the rotation reference part and larger in amplitude than the first waveform, as the waveform signal, and
   the peak/bottom detection unit detects the peak value or the bottom value of the amplitude of the second waveform larger than the amplitude of the first waveform.

2. The rotation detector according to claim 1, further comprising:
   a second resistor that has a third magnetic resistive element and a fourth magnetic resistive element connected in series with each other, and outputs a first detection signal on the basis of a change in resistance value when the third magnetic resistive element and the fourth magnetic resistive element are affected by the magnetic field with the rotation of the rotating body;
a third resistor that has a fifth magnetic resistive element and a sixth magnetic resistive element connected in series with each other, and outputs a second detection signal on the basis of a change in resistance value when the fifth magnetic resistive element and the sixth magnetic resistive element are affected by the magnetic field with the rotation of the rotating body; and
a binarizing unit that receives the first detection signal and the second detection signal, generates an angle signal corresponding to a rotation angle of the rotating body from the first detection signal and the second detection signal, and compares the angle signal with a binarization threshold to binalize the angle signal, wherein
the determination unit receives the angle signal from the binarizing unit, outputs the angle signal to an external, and outputs a rotation reference position signal indicative of position information on the rotation reference position to the external on the basis of a rising edge or a falling edge of the binarized angle signal.

3. A rotation detector configured to detect a rotation reference position with respect to rotation of a rotating body having an outer peripheral part and a rotation reference part indicative of a rotation reference position in a part of the outer peripheral part, the rotation detector comprising:

a rotation detection sensor that is disposed to face the outer peripheral part of the rotating body, outputs a detection signal corresponding to a position of the outer peripheral part with the rotation of the rotating body, detects the rotation reference position with the detection of switching from the outer peripheral part to the rotation reference part on the basis of a gap to the rotating body, detects switching from the rotation reference part to the outer peripheral part, and outputs a rotation reference position signal indicative of position information of the rotation reference position at timing of the detection; and
a signal processing unit that receives the detection signal and the rotation reference position signal from the rotation detection sensor, and acquires the rotation reference position on the basis of the rotation reference position signal, wherein
the rotation detection sensor outputs to the signal processing unit an advance notice signal indicating that the rotation reference position signal is output in a period after detecting the rotation reference position before detecting switching from the rotation reference part to the outer peripheral part.

* * * * *